(12) United States Patent  (10) Patent No.: US 8,196,656 B2
Gissler  (45) Date of Patent: Jun. 12, 2012

(54) POSITION SENSOR FOR WELL TOOLS

(75) Inventor: Robert Gissler, Spring, TX (US)

(73) Assignee: Welldynamics, Inc., Spring, TX (US)

( * ) Notice: Subject to any disclaimer, the term of this patent is extended or adjusted under 35 U.S.C. 154(b) by 797 days.

(21) Appl. No.: 12/206,291

(22) Filed: Sep. 8, 2008

(65) Prior Publication Data

US 2009/0071717 A1  Mar. 19, 2009

(30) Foreign Application Priority Data

Sep. 19, 2007 (WO) ............... PCT/US2007/078872
Sep. 28, 2007 (WO) ............... PCT/US2007/079945

(51) Int. Cl.
*E21B 47/09* (2006.01)
(52) U.S. Cl. ...................... 166/255.1; 175/45
(58) Field of Classification Search ............... 166/255.1; 175/45
See application file for complete search history.

(56) References Cited

U.S. PATENT DOCUMENTS

| | | | |
|---|---|---|---|
| 2,558,427 A | 6/1951 | Fagan | |
| 2,698,920 A | 1/1955 | Gieske | |
| 3,105,551 A * | 10/1963 | Ehlert | ........................ 166/66.4 |
| 3,222,591 A | 12/1965 | Mynall | |
| 3,430,712 A | 3/1969 | Stafford | |
| 3,575,650 A | 4/1971 | Fengler | |
| 3,906,328 A | 9/1975 | Wenrich et al. | |
| 5,030,490 A | 7/1991 | Bronowicki et al. | |
| 5,156,220 A | 10/1992 | Forehand et al. | |
| 5,320,325 A | 6/1994 | Young et al. | |
| 5,965,964 A | 10/1999 | Skinner et al. | |
| 6,062,315 A | 5/2000 | Reinhardt | |
| 6,095,248 A | 8/2000 | Freeman | |
| 6,247,536 B1 | 6/2001 | Leismer et al. | |
| 6,343,649 B1 | 2/2002 | Beck et al. | |
| 6,411,084 B1 | 6/2002 | Yoo | |
| 6,446,717 B1 | 9/2002 | White et al. | |
| 6,484,800 B2 | 11/2002 | Carmody et al. | |
| 7,673,683 B2 * | 3/2010 | Gissler | ........................ 166/255.1 |
| 7,779,912 B2 * | 8/2010 | Gissler | ........................ 166/255.1 |
| 2001/0054505 A1 * | 12/2001 | Carmody et al. | ........ 166/250.15 |
| 2002/0014338 A1 * | 2/2002 | Purkis et al. | ................... 166/375 |
| 2002/0027002 A1 * | 3/2002 | Carmody et al. | ............... 166/66 |
| 2004/0261688 A1 | 12/2004 | MacGregor et al. | |

(Continued)

OTHER PUBLICATIONS

International Search Report and Written Opinion issued Oct. 21, 2009, for International Patent Application Serial No. PCT/US09/56339, 8 pages.

(Continued)

*Primary Examiner* — John Fitzgerald
(74) *Attorney, Agent, or Firm* — Marlin R. Smith

(57) ABSTRACT

A position sensor for well tools. A position sensor includes an indicator portion including a carrier supporting a resistive element and at least one contact, and a support device for supporting the carrier. Another position sensor includes an indicator portion including a slider for displacing at least one contact relative to a resistive element, the slider being displaceable between first and second limits, and an end load mechanism including a biasing device which exerts a biasing force on the slider as the slider approaches at least the first limit. Another position sensor includes an indicator portion including a resistive element and at least one contact which contacts and displaces across the resistive element, a change in position of the contact relative to the resistive element being indicated by a resistance change as the contact displaces across the resistive element.

7 Claims, 20 Drawing Sheets

U.S. PATENT DOCUMENTS

2007/0170914 A1     7/2007   Gissler
2007/0170915 A1     7/2007   Gissler

OTHER PUBLICATIONS

Office Action issued Oct. 28, 2009, for U.S. Appl. No. 11/679,793, 5 pages.
International Search Report and Written Opinion issued Jan. 28, 2008, for International Patent Application Serial No. PCT/US07/79945, 8 pages.
International Search Report and Written Opinion issued Apr. 11, 2008, for International Patent Application Serial No. PCT/US07/78872, 8 pages.
International Search Report issued Nov. 14, 2006, for International Patent Application Serial No. PCT/US06/08375, 1 page.
International Search Report issued Oct. 23, 2006, for International Patent Application Serial No. PCT/US06/02118, 1 page.
International Preliminary Report on Patentability and Written Opinion issued Aug. 7, 2008, for International Patent Application Serial No. PCT/US06/02118, 5 pages.
Office Action issued Sep. 24, 2008, for U.S. Appl. No. 11/624,282, 18 pages.
Office Action issued Nov. 5, 2008, for U.S. Appl. No. 11/679,793, 14 pages.
Examiner's first report issued Jan. 27, 2010, for Australian Patent Application Serial No. 2006336317, 2 pages.
Office Action issued Mar. 11, 2009, for U.S. Appl. No. 11/624,282, 10 pages.
International Preliminary Report on Patentability issued Apr. 1, 2010, for International Patent Application Serial No. PCT/US07/079945, 7 pages.
International Preliminary report on Patentability issued Mar. 24, 2011, for International Patent Application No. PCT/US09/056339, 7 pages.
Office Action Issued May 12, 2009, for U.S. Appl. No. 11/679,793, 7 pages.

* cited by examiner

POSITION SENSOR FOR WELL TOOLS

CROSS-REFERENCE TO RELATED APPLICATIONS

The present application claims the benefit under 35 USC §119 of the filing date of International Application Nos. PCT/US07/78872, filed Sep. 19, 2007, and PCT/US07/79945, filed Sep. 28, 2007. The entire disclosures of these prior applications are incorporated herein by this reference.

BACKGROUND

In some types of well tools, it is beneficial to be able to determine precisely the configuration of the tool at given points in time. For example, a downhole choke has a closure assembly which is opened or closed by varying amounts to produce a corresponding increase or decrease in flow through the choke. To obtain a desired flow rate through the choke, it is important to be able to determine the position of the closure assembly.

Therefore, it will be appreciated that improvements in position sensors are desirable for use with well tools. As with other instrumentation, sensors and other equipment used in well tools, factors such as space, reliability, ability to withstand a hostile environment, cost and efficiency are important in improved position sensors for use with well tools.

SUMMARY

In carrying out the principles of the present invention, a position sensor is provided which solves at least one problem in the art. One example is described below in which the position sensor includes a support device and a damping device which function to protect components of an indicator portion of the sensor, while also stabilizing an electrical signal provided by the indicator portion. Another example is described below in which contacts and a resistive element of the indicator portion are configured to provide enhanced indications of position.

In one aspect, a position sensor for a well tool is provided. The position sensor includes an indicator portion with a carrier supporting a resistive element and at least one contact. A support device is made of a shape memory alloy for supporting the carrier.

In another aspect, a position sensor for a well tool includes an indicator portion including a slider for displacing at least one contact relative to a resistive element. The slider is displaceable between first and second limits. An end load mechanism includes a biasing device which exerts a biasing force on the slider as the slider approaches at least the first limit.

In yet another aspect, a position sensor for a well tool includes an indicator portion including a resistive element and at least one contact which contacts and displaces across the resistive element. A change in position of the contact relative to the resistive element is indicated by a resistance change as the contact displaces across the resistive element.

The resistance change may comprise at least one resistance spike. The resistance spike may be in a positive and/or negative direction. The position of the contact relative to the resistive element may be indicated by a corresponding number of the resistance spikes. The resistance change may also include a gradual increase or decrease in resistance, depending on direction of displacement of the contact relative to the resistive element.

A temperature change in the indicator portion may be indicated by a change in indicated resistance corresponding to a predetermined position of the contact relative to the resistive element.

The position sensor may also include a damping device which dampens deflection of the contact relative to the resistive element in response to movement of the indicator portion. The damping device may include a viscoelastic material in contact with the contact.

The contact may include at least two opposing contact fingers, at least one of the fingers providing an electrical grounding for an electrical circuit including the resistive element.

These and other features, advantages, benefits and objects will become apparent to one of ordinary skill in the art upon careful consideration of the detailed description of representative embodiments of the invention hereinbelow and the accompanying drawings, in which similar elements are indicated in the various figures using the same reference numbers.

DETAILED DESCRIPTION

Figure 1:
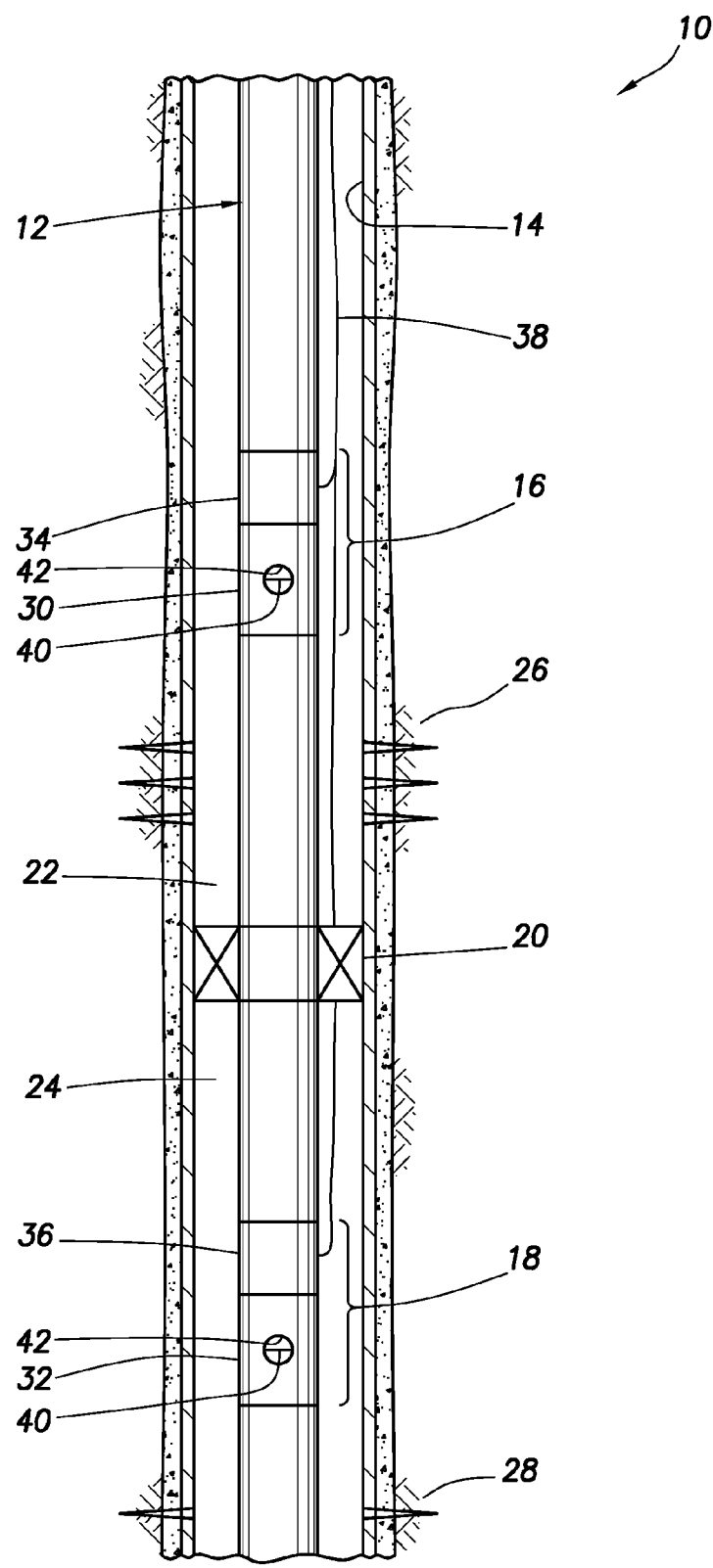
FIG. 1 is a schematic partially cross-sectional view of a well system embodying principles of the present invention.

Representatively illustrated in FIG. 1 is a well system 10 which embodies principles of the present invention. In the following description of the system 10 and other apparatus and methods described herein, directional terms, such as "above", "below", "upper", "lower", etc., are used for convenience in referring to the accompanying drawings. Additionally, it is to be understood that the various embodiments of the present invention described herein may be utilized in various orientations, such as inclined, inverted, horizontal, vertical, etc., and in various configurations, without departing from the principles of the present invention. The embodiments are described merely as examples of useful applications of the principles of the invention, which is not limited to any specific details of these embodiments.

As depicted in FIG. 1, a tubular string 12 has been installed in a wellbore 14. Two well tools 16, 18 are interconnected in the tubular string 12 for controlling a rate of production from each of respective zones 26, 28 intersected by the wellbore 14. Note that, instead of production, either of the well tools 16, 18 could be used for controlling a rate of injection into either of the zones 26, 28.

A packer 20 isolates an upper annulus 22 from a lower annulus 24. Thus, the well tool 16 controls the rate of flow between the upper annulus 22 and the interior of the tubular string 12, and the well tool 18 controls the rate of flow between the lower annulus 24 and the interior of the tubular string. For this purpose, the well tool 16 includes a choke 30 and an associated actuator 34, and the well tool 18 includes a choke 32 and an associated actuator 36.

Although the well tools 16, 18 are described as including the respective chokes 30, 32 and actuators 34, 36, it should be clearly understood that the invention is not limited to use with only these types of well tools. For example, the principles of the invention could readily be incorporated into the packer 20 or other types of well tools, such as artificial lift devices, chemical injection devices, multilateral junctions, valves, perforating equipment, any type of actuator (including but not limited to mechanical, electrical, hydraulic, fiber optic and telemetry controlled actuators), etc.

In the system 10 as illustrated in FIG. 1, each of the chokes 30, 32 includes a closure assembly 40 which is displaced by the respective actuator 34, 36 relative to one or more openings 42 to thereby regulate the rate of fluid flow through the openings. One or more lines 38 are connected to each actuator 34, 36 to control operation of the actuators. The lines 38 could be fiber optic, electric, hydraulic, or any other type or combination of lines. Alternatively, the actuators 34, 36 could be controlled using acoustic, pressure pulse, electromagnetic, or any other type or combination of telemetry signals.

Figure 2:
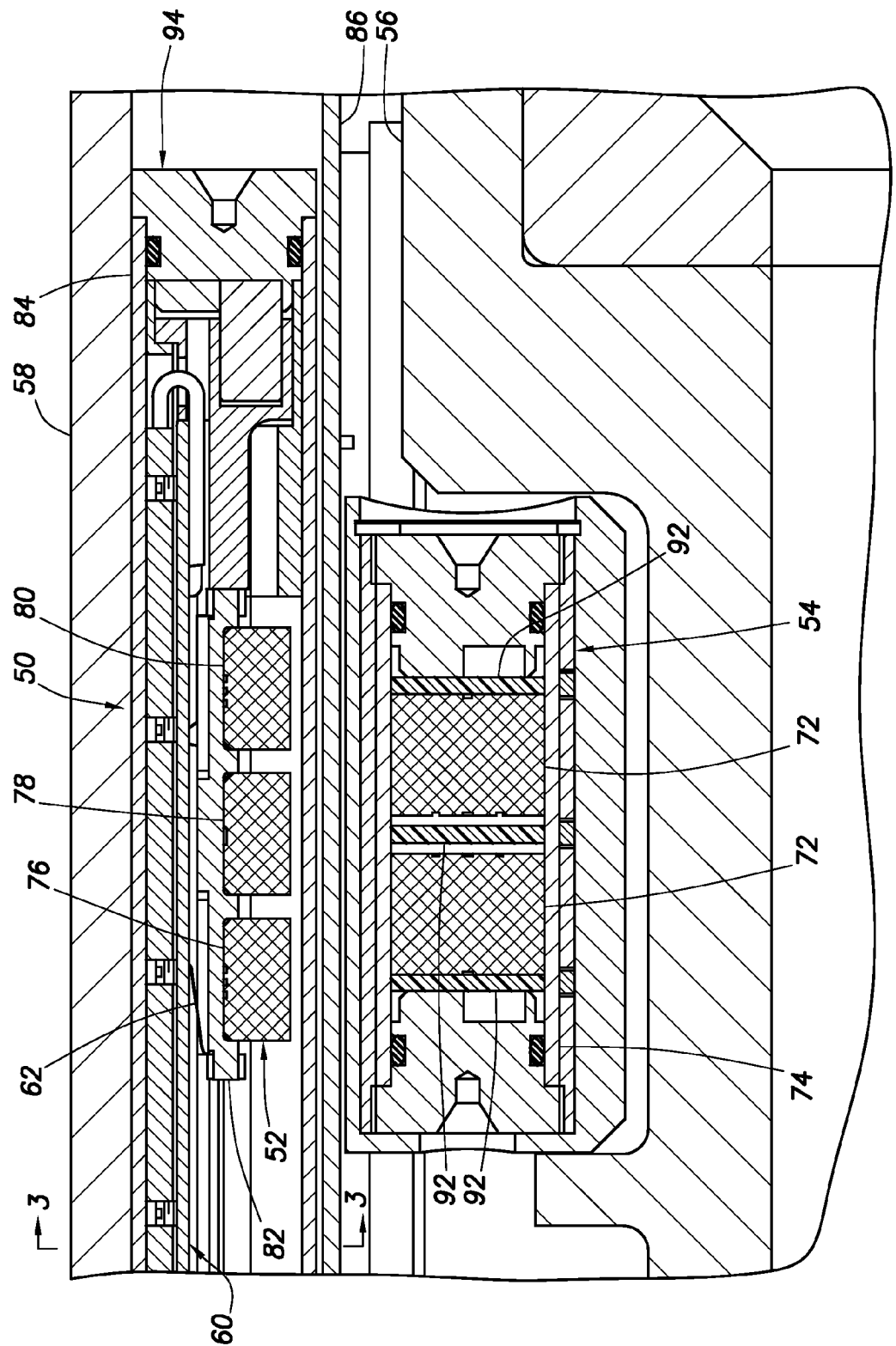
FIG. 2 is an enlarged scale longitudinal cross-sectional view of a position sensor which may be used in the well system, and which embodies principles of the present invention.

Referring additionally now to FIG. 2, an enlarged scale cross-sectional view of a magnetically coupled position sensor 50 embodying principles of the invention is representatively illustrated. The position sensor 50 may be used in either or both of the well tools 16, 18 in the system 10 and/or in other types of well tools. For convenience and clarity, the following description will refer only to use of the position sensor 50 in the well tool 16, but it should be understood that the position sensor could be similarly used in the well tool 18.

The position sensor 50 includes two magnet assemblies 52, 54. One of the magnet assemblies 54 is attached to a member 56 which is part of the closure assembly 40. The other magnet assembly 52 is slidably or reciprocably attached to an outer housing member 58 of the actuator 34. The housing member 58 is part of an overall outer housing assembly of the well tool 16.

In operation of the actuator 34, the closure assembly member 56 is displaced relative to the housing member 58 to regulate flow through the opening 42. The position sensor 50 is used to establish the relative positions of the members 56, 58 (e.g., by indicating how the member 56 should be displaced to obtain a desired position relative to the member 58), so that the flow rate through the opening 42 can be determined or adjusted.

The magnet assemblies 52, 54 are magnetically coupled to each other, so that when the closure assembly member 56 displaces relative to the housing member 58, the magnet assembly 52 displaces with the magnet assembly 54 and slides relative to the housing member. A resistive element 60 is rigidly attached relative to the housing member 58. Contacts 62 which displace with the magnet assembly 52 electrically contact and slide across the resistive element 60 as the magnet assembly 52 displaces.

Various examples of configurations of the resistive element 60 are described below. In addition, any of the features of the resistive element described in U.S. patent application Ser. No. 11/679,793, filed Feb. 27, 2007, may be used in the position sensor 50, if desired. Furthermore, any of the features of the position sensors described in this prior application may be used in the position sensor 50, if desired. The entire disclosure of this prior application is incorporated herein by this reference.

The magnet assembly 54 as illustrated in FIG. 2 includes two magnets 72 contained within a pressure bearing housing 74. The housing 74 is preferably made of a non-magnetically permeable material (such as inconel, etc.). The housing 74 isolates the magnets 72 from well fluid and debris in the well tool 16.

The magnet assembly 52 includes three magnets 76, 78, 80 mounted on a slider 82. The magnet assembly 52 and resistive element 60 are enclosed within a sealed tubular structure 84. The tubular structure 84 is supported by an inner tubular wall 86, which also protects the tubular structure from debris (such as magnetic particles, etc.) in the well fluid. The tubular structure 84 and inner wall 86 are preferably made of a non-magnetically permeable material, so that they do not interfere with the magnetic coupling between the magnet assemblies 52, 54.

Note that, in this embodiment, the magnets 72 have like poles facing each other, with their pole axes being aligned and collinear with each other. It will be appreciated by those skilled in the art that this configuration produces a high magnetic flux density between the magnets 72 perpendicular to the pole axes.

To take advantage of this high magnetic flux density between the magnets 72, the magnet 78 is positioned with its opposite pole facing toward the high magnetic flux density between the magnets 72, and with its pole axis perpendicular to the pole axes of the magnets 72. This serves to increase the magnetic coupling force between the magnets 72 and the magnet 78.

In order to concentrate the magnetic flux density at the opposite ends of the magnets 72, a magnetically permeable material (such as a steel alloy) 92 is positioned at each opposite end, and between the magnets, and is oriented perpendicular to the pole axes. It will be appreciated by those skilled in the art that this configuration produces a high magnetic flux density at the opposite ends of the magnets 72 perpendicular to the pole axes.

To take advantage of this high magnetic flux density at the opposite ends of the magnets 72, the magnets 76, 80 are positioned with their opposite poles facing toward the high magnetic flux density at the opposite ends of the magnets 72, and with their respective pole axes perpendicular to the pole axes of the magnets 72. This serves to further increase the magnetic coupling force between the magnets 72 and the magnets 76, 80.

The slider 82 could be made of a magnetically permeable material, in order to decrease a magnetic reluctance between the magnets 76, 78, 80. This would further serve to increase the magnetic flux density and magnetic coupling force between the magnets 76, 78, 80 and the magnets 72.

It should be clearly understood that other numbers and arrangements of the magnets 72, 76, 78 and 80 may be used, and the magnet assemblies 52, 54 may be otherwise configured without departing from the principles of the invention.

There could be multiple magnet assemblies 54 circumferentially distributed about the member 56, so that at least one of the magnet assemblies 54 would be closely radially aligned with the magnet assembly 52. In this manner, it would not be necessary to radially align the closure assembly member 56 relative to the housing member 58. In the FIG. 2 embodiment, the member 56 can rotate relative to the magnet assembly 54, and the magnet assembly is separately aligned with the magnet assembly 52, so that it is not necessary to radially align the members 56, 58 with each other. However, the members 56, 58 could be radially aligned, if desired.

Figure 3:
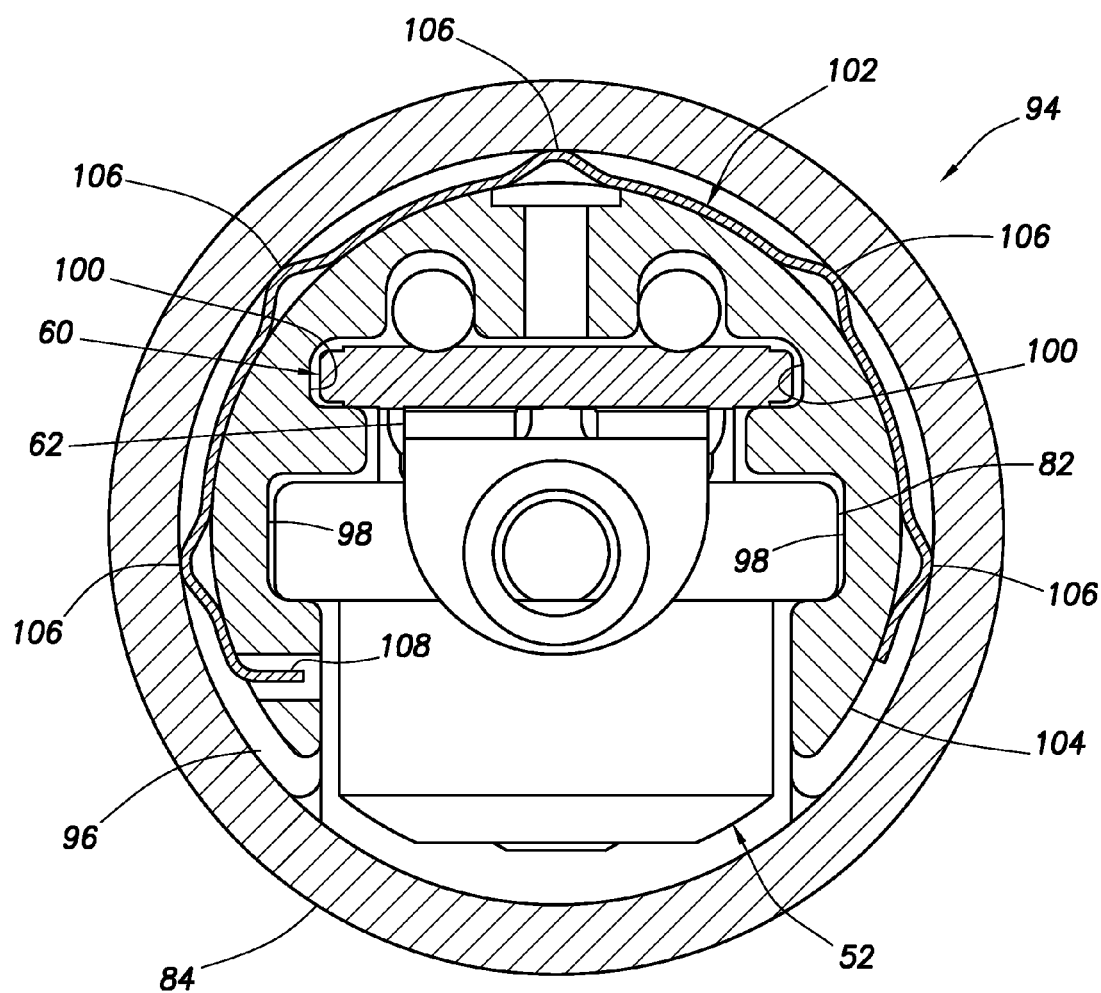
FIG. 3 is a further enlarged scale lateral cross-sectional view of an indicator portion of the position sensor.

Referring additionally now to FIG. 3, an enlarged scale cross-sectional view of an indicator portion 94 of the position sensor 50 is representatively illustrated apart from the remainder of the position sensor. In this view, it may be seen that the indicator portion 94 includes the magnet assembly 52, slider 82, resistive element 60 and contacts 62 contained within the tubular structure 84.

The magnet assembly 52, slider 82, resistive element 60 and contacts 62 are positioned relative to a carrier 96. The slider 82 is received in longitudinal slots 98, so that the slider, magnet assembly 52 and contacts 62 are longitudinally reciprocable relative to the carrier 96. The resistive element 60 is received in longitudinal slots 100, but is rigidly secured relative to the carrier 96.

It will be appreciated that a wellbore is a harsh environment for precision measuring instruments, in part due to impacts, vibration, temperature extremes, etc. The indicator portion 94 includes features which function to mitigate the harmful effects of the wellbore environment.

Specifically, the indicator portion 94 includes a support device 102 which maintains a secure positional relationship between the carrier 96 and the tubular structure 84. The support device 102 is received in a recess 104 which at least partially encircles the carrier 96.

Figure 4:
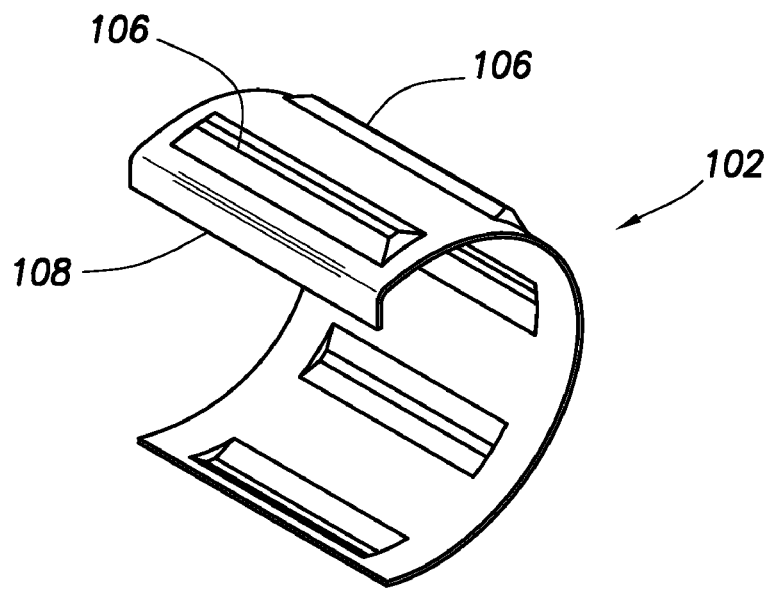
FIG. 4 is an isometric view of a support device of the indicator portion.

An enlarged isometric view of the support device 102 is representatively illustrated in FIG. 4. In this view it may be seen that the support device 102 includes multiple radially outwardly extending projections 106 and at least one inwardly extending tab 108.

The projections 106 engage an interior surface of the tubular structure 84 about the carrier 96, and thereby function to maintain the carrier centralized within the tubular structure. The tab 108 engages the carrier 96 and functions to rotationally secure the support device 102 relative to the carrier.

The support device 102 could be shaped differently from the configuration depicted in FIG. 3. For example, the projections 106 could face inwardly instead of outwardly, in which case the main circular body of the support device 102 would engage the interior of the tubular structure 84 and the projections 106 would engage the carrier 96, or projections of the support device could face in both inward and outward directions, etc.

The support device 102 is beneficially capable of minimizing movement of the carrier 96 relative to the tubular structure 84, and does so in a minimum of required space. Furthermore, the support device 102 is preferably, but not necessarily, made of a shape memory alloy material which will cause the support device to extend radially outward to increasingly forcefully engage the interior of the tubular structure 84 when the increased temperatures of the wellbore environment are encountered.

Thus, it will be appreciated that the support device 102 limits movement of the carrier 96 both axially and radially relative to the tubular structure 84 (thereby minimizing the damaging effects of impact and vibration on the indicator portion 94, and minimizing the negative effects on the signal generated by the indicator portion) due to the engagement between the support device and the interior of the tubular structure.

Further examples are provided below of shape memory alloy support devices 102 which achieve these objectives by slightly deforming the carrier 96, so that the carrier itself bears against the interior of the tubular structure 84 (see FIGS. 23-26 and accompanying description below). In particular, the support devices 102 described herein prevent damage to the contacts 62 and resistive element 60 due to shock and vibration, and enhance stability of the electrical signals which provide indications of the position of the slider 82 (and thus the closure assembly member 56) relative to the tubular structure 84.

Figure 5:
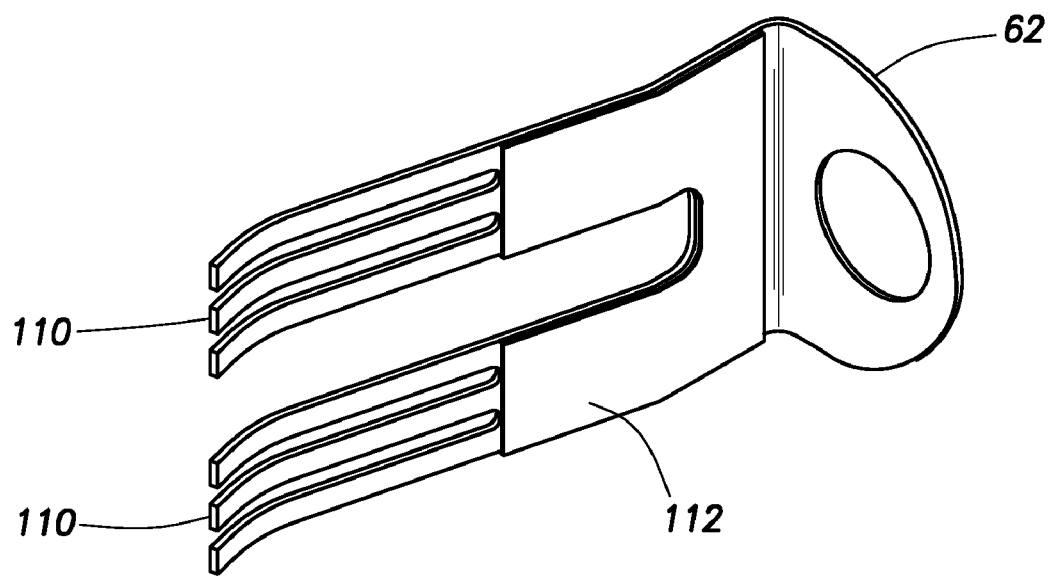
FIG. 5 is an isometric view of contacts and a damping device of the indicator portion.

Referring additionally now to FIG. 5, an isometric view of the contacts 62 is representatively illustrated apart from the remainder of the indicator portion 94. In this view, it may be seen that the contacts 62 include resilient bent conductive fingers 110 which contact the resistive element 60.

In order to prevent undesirable movements of the contacts 62 (which movements can be a source of electrical noise), a damping device 112 is attached to the contacts. The damping device 112 is preferably made up of multiple layers, including at least a viscoelastic material and a backing material.

The damping device 112 will dampen deflections of the contacts 62, and thereby help to maintain constant, stable contact between the fingers 110 and the resistive element 60, and also reduce or eliminate stress fatiguing of the contact fingers. Although the damping device 112 is depicted in FIG. 5 as not extending onto the fingers 110 themselves, the damping device could be attached to the fingers, if desired.

Figure 6:
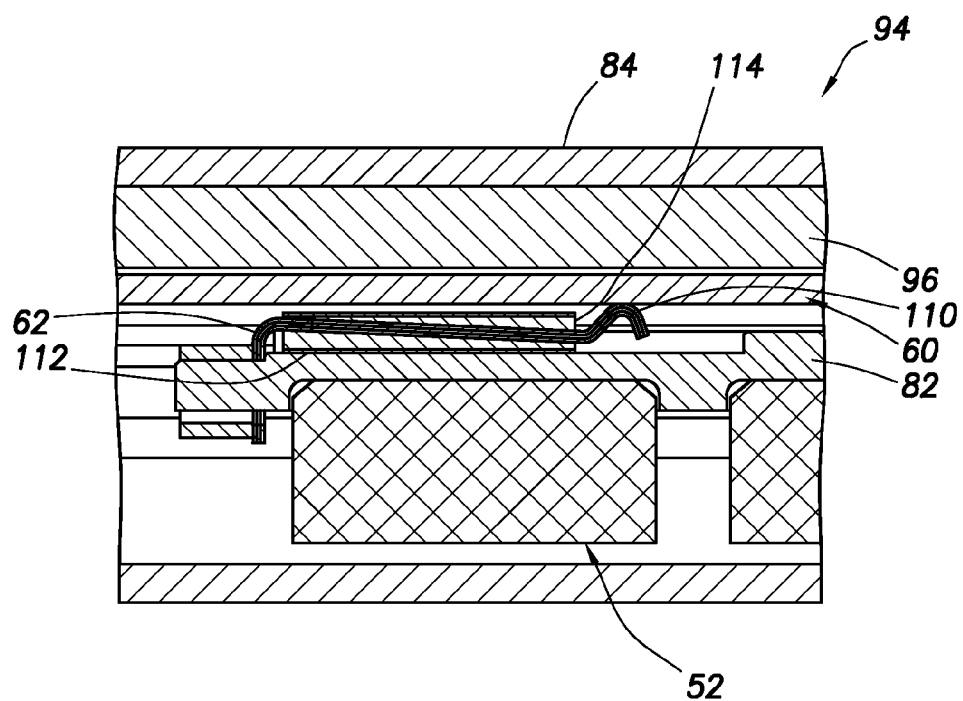
FIG. 6 is a longitudinal cross-sectional view of a section of the indicator portion, showing an alternate damping device.

An alternative configuration is representatively illustrated in FIG. 6. In this configuration, the damping device 112 is attached to the slider 82, and the contact fingers 110 extend through the damping device.

The fingers 110 could, for example, extend through a viscoelastic or foam material 114 of the damping device 112, which is sandwiched between backing material. The backing material could be metal or another rugged and temperature resistant material.

Figure 7:
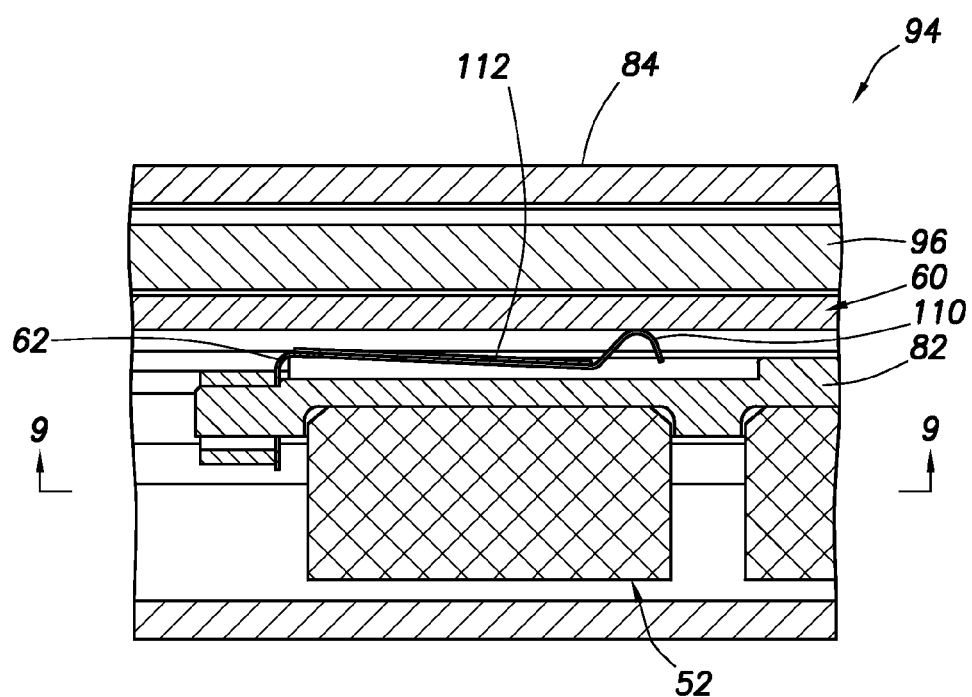
FIG. 7 is a longitudinal cross-sectional view of the section of the indicator portion, showing another alternate damping device.

Another alternate configuration is representatively illustrated in FIG. 7. In this configuration, the damping device 112 is attached to an opposite side of the contacts 62 as compared to the configuration of FIG. 5. This demonstrates that the damping device 112 may be attached to any surface or portion of the contacts 62 in keeping with the principles of the invention.

Figure 8:
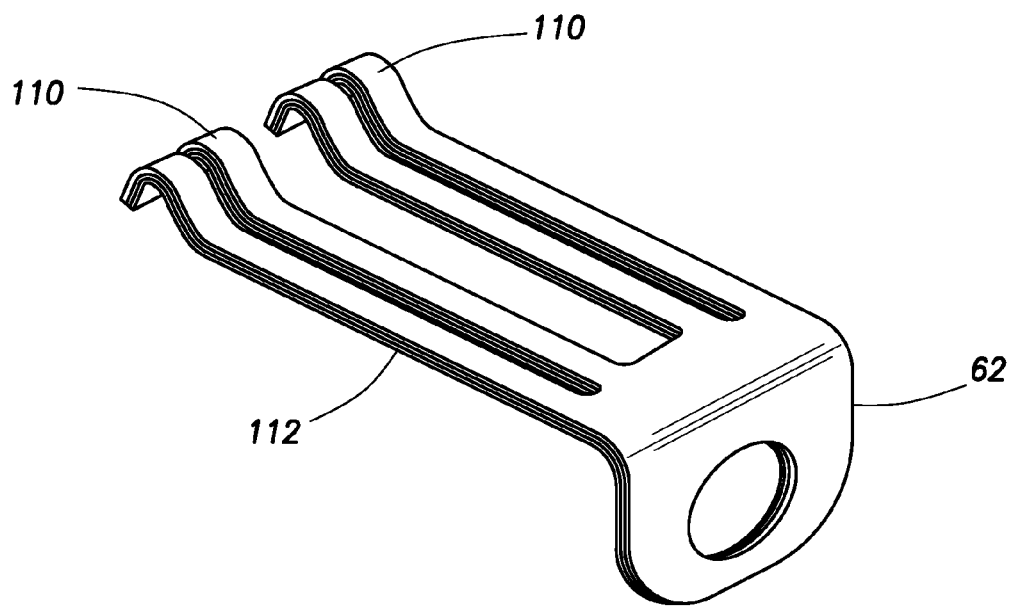
FIG. 8 is an isometric view of the contacts, showing yet another alternate damping device.

Yet another alternate configuration is representatively illustrated in FIG. 8. In this configuration, the damping device 112 is attached to an entire side of the contacts 62, including to the contact fingers 110. This configuration may maximize the damping effect provided by the device 112.

Note that any combination and number of the damping device 112 configurations depicted in FIGS. 5-8 may be used on the contacts 62 in keeping with the principles of the invention.

Figure 9:
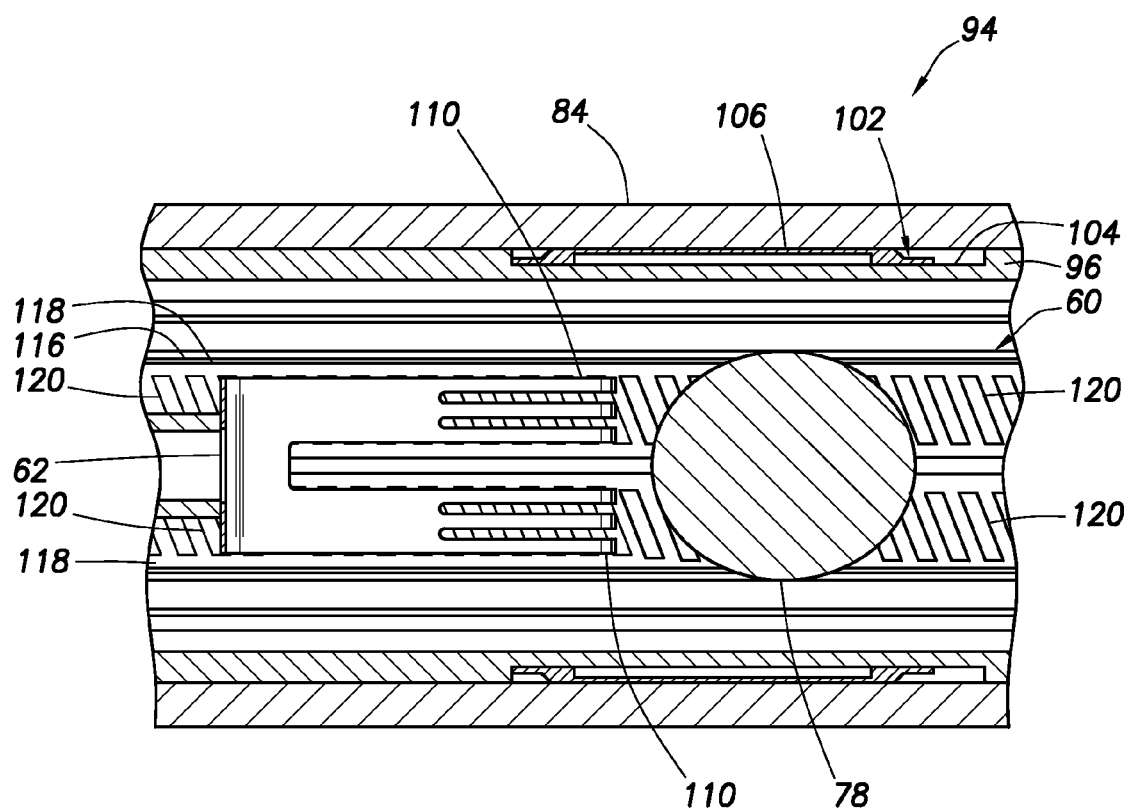
FIG. 9 is a longitudinal partially cross-sectional view of the indicator portion, showing a relationship between the contacts, a resistive element, the support device and a carrier.

Referring additionally now to FIG. 9, another cross-sectional view of the indicator portion 94 is representatively illustrated. In this view, the slider 82 and the magnet assembly 52 are not shown (with the exception of one magnet 78), so that the positional relationship between the contacts 62 and the resistive element 60 may be clearly seen.

The resistive element 60 includes a longitudinally extending dielectric or insulator layer 116 on which two longitudinally extending resistive traces 118 are positioned. When the contact fingers 110 make contact with the resistive traces 118, an electrical connection is made (via the contacts 62) between the resistive traces. Depending on the position of the contacts 62 longitudinally along the resistive traces 118, a variable resistance will be measured (between the ends of the resistive traces) corresponding to the position, thereby giving an indication of the position of the contacts (and, thus the position of the closure assembly member 56).

Each specific resistance value corresponding to each specific position is affected in a predictable fashion by a change in temperature. This can be quantified in units such as parts per million per ° C., or ohms per ohms per ° C. This means that the resistance value for a known position can be compared to the value recorded at a known temperature during testing/calibration. The difference in readings can then be converted to a difference in temperature. The accuracy of the temperature measurement can be varied depending on the materials selected.

To ensure good electrical contact between the fingers 110 and the resistive traces 118, conductive strips 120 are applied to the surfaces of the resistive traces 118. The conductive strips 120 may be metallic, a combination of metal and other materials, non-metallic, etc. For example, a material known as silver cermet (a combination of ceramic, metal and glass) could be used for the strips 120, if desired.

As depicted in FIG. 9, the conductive strips 120 are inclined relative to the longitudinal direction of the resistive traces 118, so that at least one of the fingers 110 on each lateral side of the contacts 62 is always in contact with one of the strips. In this manner, good electrical contact between the fingers 110 and the resistive traces 118 is always maintained.

The conductive strips 120 could, however, be otherwise oriented relative to the resistive traces 118. For example, the conductive strips 120 could extend laterally (e.g., perpendicular) relative to the longitudinal direction of the resistive traces 118, as depicted for the resistive element 60 configuration of FIG. 11 (described more fully below).

In one preferred configuration, the contact fingers 110 would have relatively sharp edges where the fingers contact the resistive element 60. In this manner, a higher resolution resistance measurement may be obtained.

If the conductive strips 120 are electrically isolated from each other (other than via the resistive traces 118 and the contacts 62), and the conductive strips are arranged so that the contact fingers 110 only intermittently contact the conductive strips (e.g., if the conductive strips extend laterally relative to the resistive traces), then the contacts will alternately provide electrical contact between the resistive traces via the conductive strips and directly between the resistive traces (without aid of the conductive strips).

Figure 10:
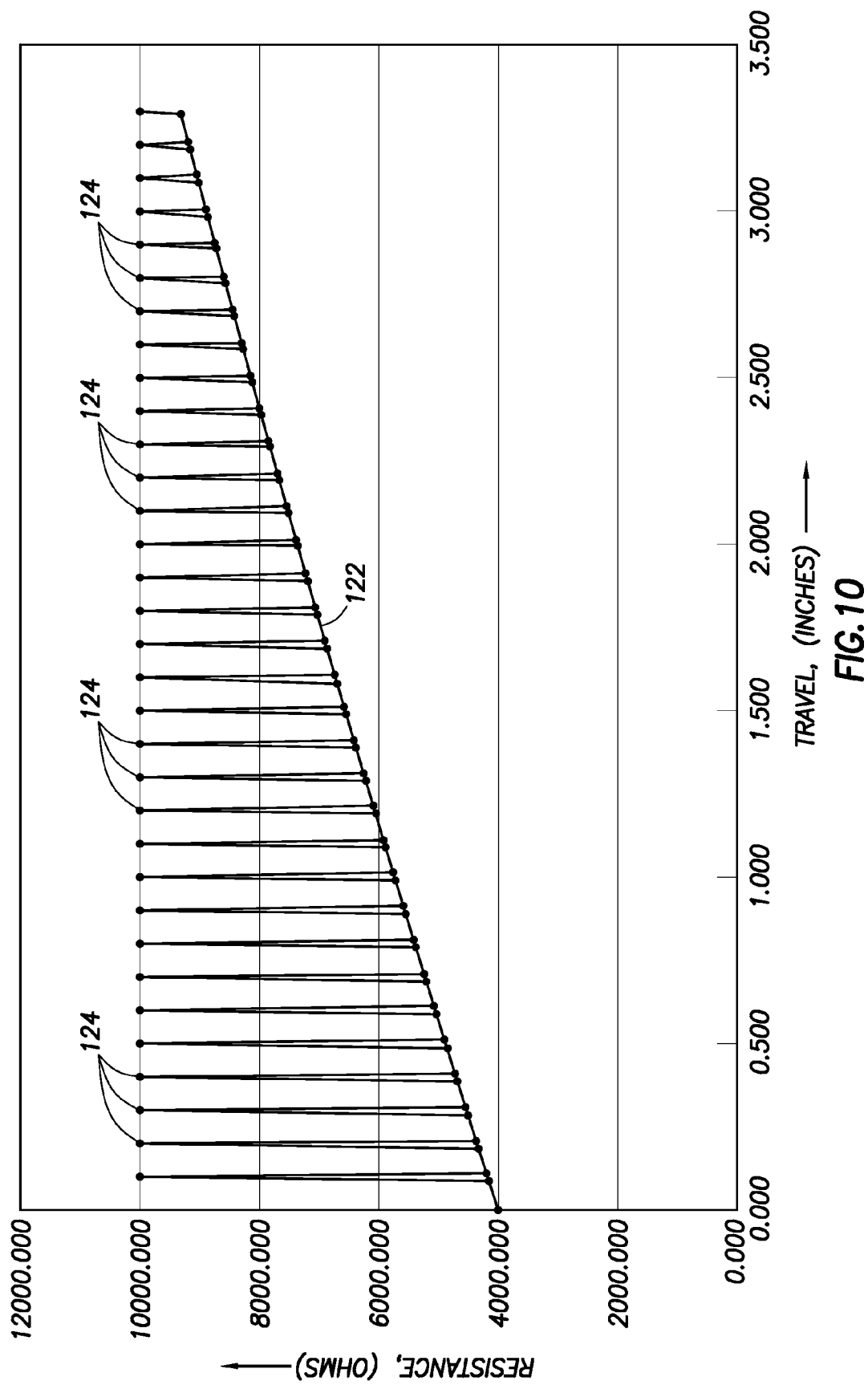
FIG. 10 is a graph of resistance versus displacement of the contacts relative to the resistive element.

In FIG. 10, a graph of resistance versus travel is representatively illustrated for the indicator portion 94 in this situation (i.e., the contacts alternately providing electrical contact between the resistive traces via the conductive strips and directly between the resistive traces). Note that an inclined base line 122 indicating a steadily increasing (or decreasing, depending on the direction of travel) resistance is depicted in the graph, along with intermittent positive spikes 124 in resistance.

The spikes 124 are caused when the contact fingers 110 leave the conductive strips 120 and begin to directly contact the resistive traces 118. Between the spikes 124, the value of the measured resistance (i.e., along the base line 122) provides a direct correlation to the position of the contacts 62 and slider 82 relative to the resistive element 60. The direction of travel is indicated by an increasing or decreasing of the measured resistance.

The spikes 124 can also provide an indication of the position of the contacts 62 and slider 82 relative to the resistive element 60. Since it is known that the spikes 124 occur at certain intervals of travel, and the number of spikes can be conveniently counted, the amount of travel can be directly correlated to the number of spikes detected. This indication of displacement can serve as a primary indication, or as a backup to the indication given by the measured resistance along the base line 122.

Figure 11:
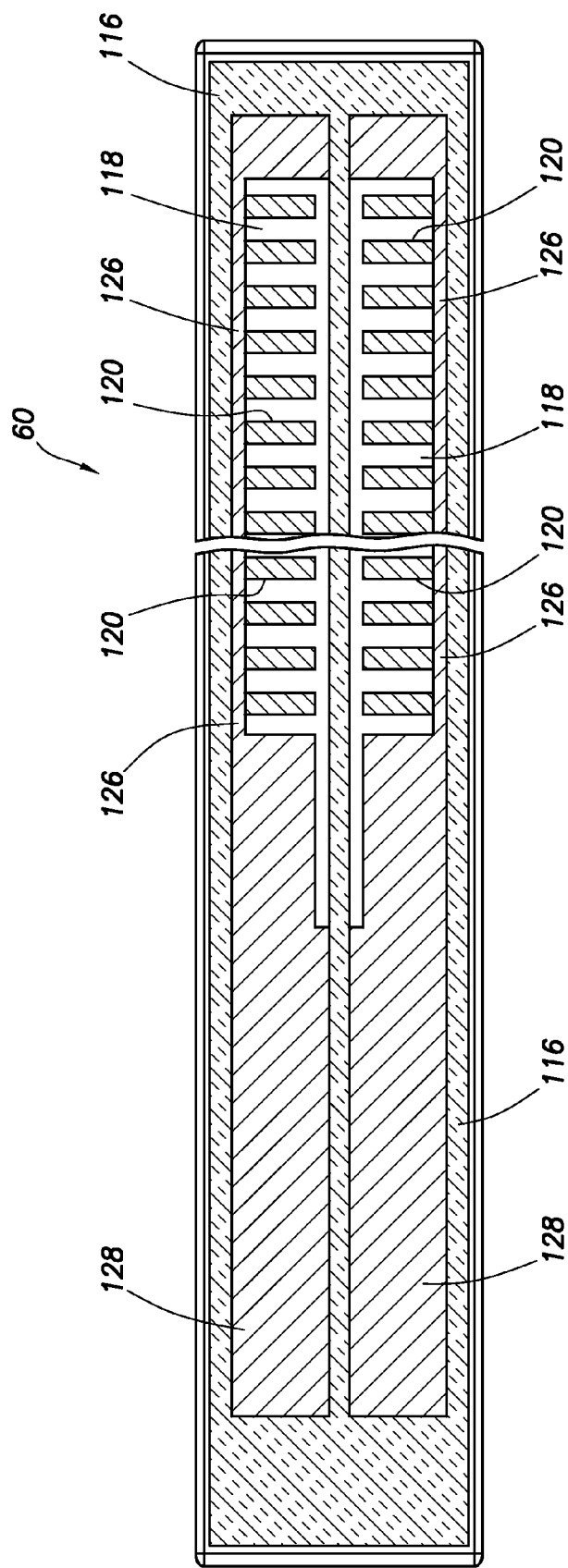
FIG. 11 is an elevational view of an alternate configuration of the resistive element.

Another configuration of the resistive element 60 is representatively illustrated in FIG. 11. In this configuration, the conductive strips 120 are oriented perpendicular to the resistive traces 118, and the conductive strips are electrically connected to each other via conductive material 126 extending longitudinally between outer ends of the strips.

Solder pads 128 are provided at ends of the conductive material 126 for wires to interconnect the resistive element 60 in a measuring system. The solder pads 128 are in electrical contact with the resistive traces 118 in the example of FIG. 11.

Electrical contact for the measuring system can be provided by means other than the solder pads 128. For example, mechanical interference types of contacts (such as press fits, shrink fits or wedge fits), cement or epoxy may be used to connect wires to the resistive element 60, particularly in higher temperature applications unsuited for typical solder connections.

Resistance between the solder pads 128 is used as an indicator of position. Of course, the measuring system may use related measurements, such as voltage or current in a constant current or constant voltage measuring system, as indicators of position, if desired. Measurement of voltage or current in a measuring system is considered equivalent to measuring resistance.

The solder pads 128, conductive material 126 and conductive strips 120 may be the same material applied simultaneously to the resistive element 60, or they could be separate materials and/or they could be separately applied as desired to separately enhance their respective functions.

Note that, underlying the conductive material 126 and conductive strips 120 is an insulative dielectric material (not visible in FIG. 11, similar to the material 116) which electrically isolates the conductive material 126 and conductive strips 120 from the resistive traces 118.

As the contact fingers 110 displace across the surface of the resistive element 60 and transition from contact with the conductive strips 120 to contact with the resistive traces 118, a positive spike in resistance will occur (due to the increased resistance of the resistive traces relative to the conductive strips). As the contact fingers 110 transition from contact with the resistive traces 118 to contact with the conductive strips 120, a negative spike in resistance will occur (due to the decreased resistance of the conductive strips relative to the resistive traces). While the contact fingers 110 are traversing the resistive traces 118 between the conductive strips 120, the resistance will gradually increase or decrease, depending on the direction of travel.

Figure 12:
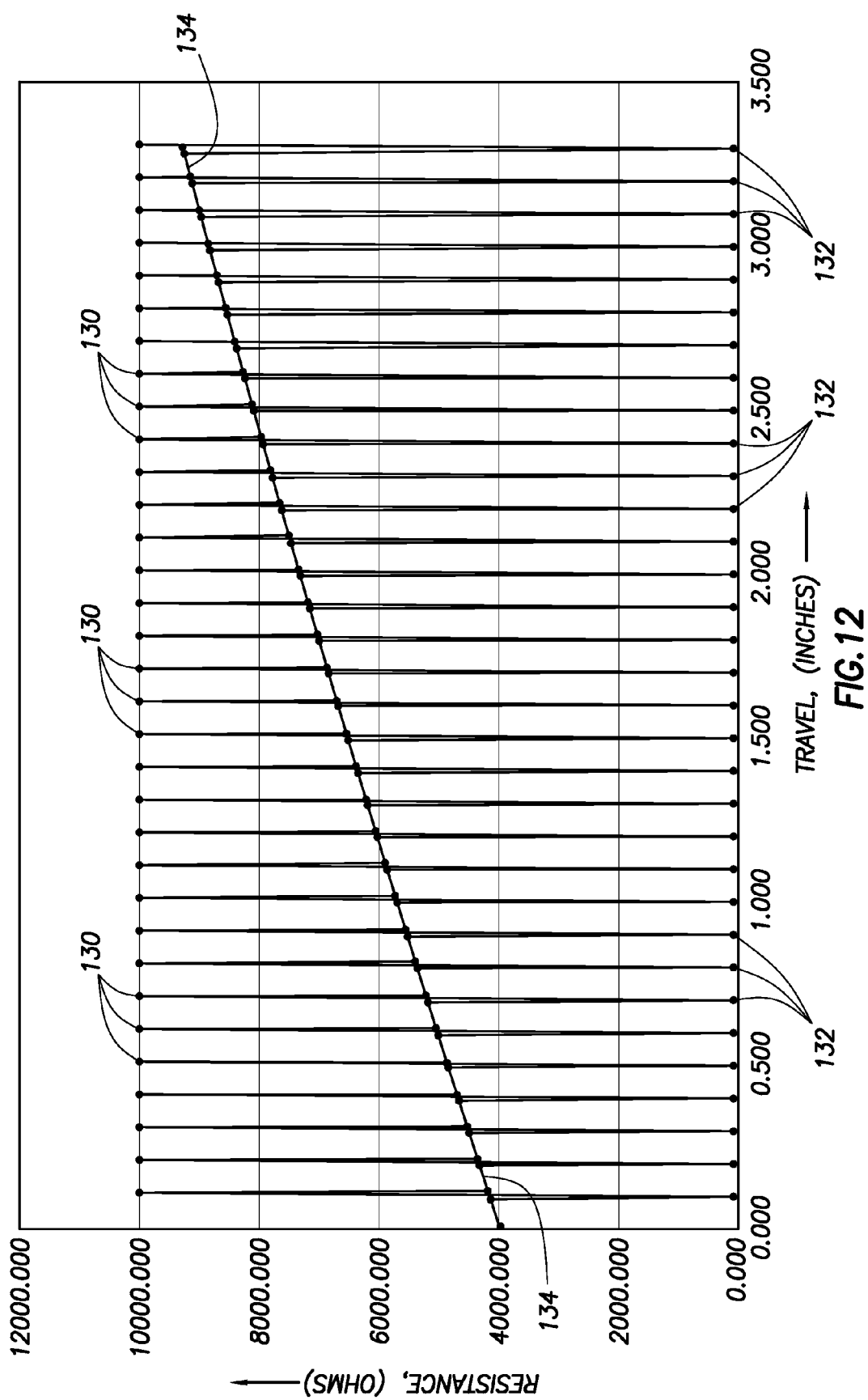
FIG. 12 is a graph of resistance versus displacement for the resistive element configuration of FIG. 11.

A graph is representatively illustrated in FIG. 12 to demonstrate an example of how resistance changes as the contacts 62 displace relative to the resistive element 60 of FIG. 11. Increased resistance spikes 130 occur when the contact fingers 110 transition from contact with the conductive strips 120 to contact with the resistive traces 118, and decreased resistance spikes 132 occur when the contact fingers 110 transition from contact with the resistive traces 118 to contact with the conductive strips 120. An inclined base line 134 resistance varies in proportion to the distance displaced by the contacts 62 relative to the resistive element 60.

It will be appreciated that the position of the contacts 62 relative to the resistive element 60 can be determined from the measured base line 134 resistance (or a resulting voltage or current in a constant current or constant voltage measuring system), and/or by counting the number of spikes 130, 132. For example, the number of spikes 130, 132 counted could serve as a backup to the measurement of base line 134 resistance.

Figure 13:
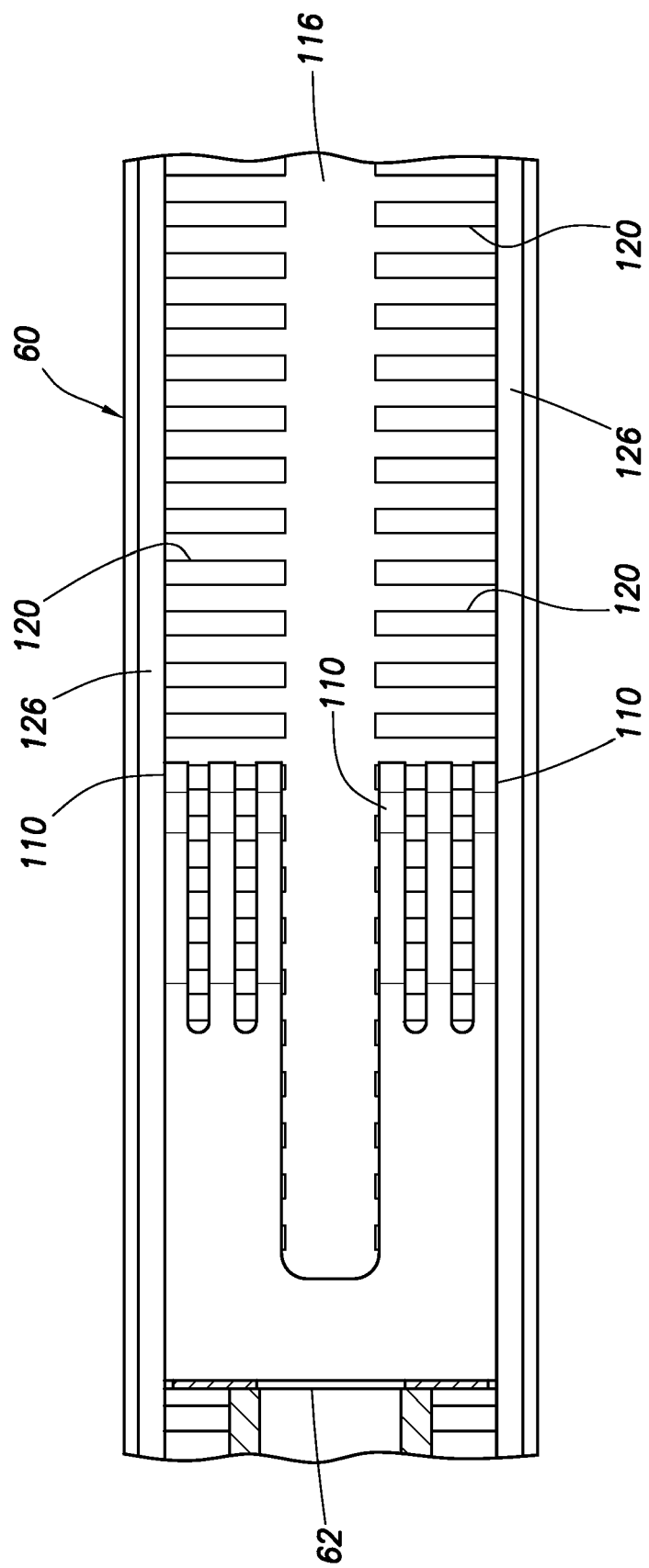
FIG. 13 is an elevational view of the contacts and another alternate configuration of the resistive element.

Another configuration of the resistive element 60 is representatively illustrated in FIG. 13. In this configuration, the resistive traces 118 are not used. Instead, the conductive strips 120, conductive material 126 and solder pads 128 are overlaid directly on the insulative (dielectric) layer 116.

Alternatively, a conductive layer forming the conductive strips 120 and conductive material 126 could be first applied to the base of the resistive element 60, and then the insulative layer 116 could be overlaid on the conductive layer. As another alternative, the base of the resistive element 60 could serve as the integral conductive strips 120, conductive material 126 and solder pads 128 (or the solder pads could be formed by plating applied to the base), with the insulative layer 116 being overlaid on the base to thereby form the shapes of the conductive strips, conductive material and solder pads.

Thus, while the contact fingers 110 are contacting the conductive strips 120, a relatively low resistance is measured across the solder pads 128 (not visible in FIG. 13), and while the contact fingers are contacting the insulative layer 116 between the conductive strips, a relatively high resistance is measured.

Figure 14:
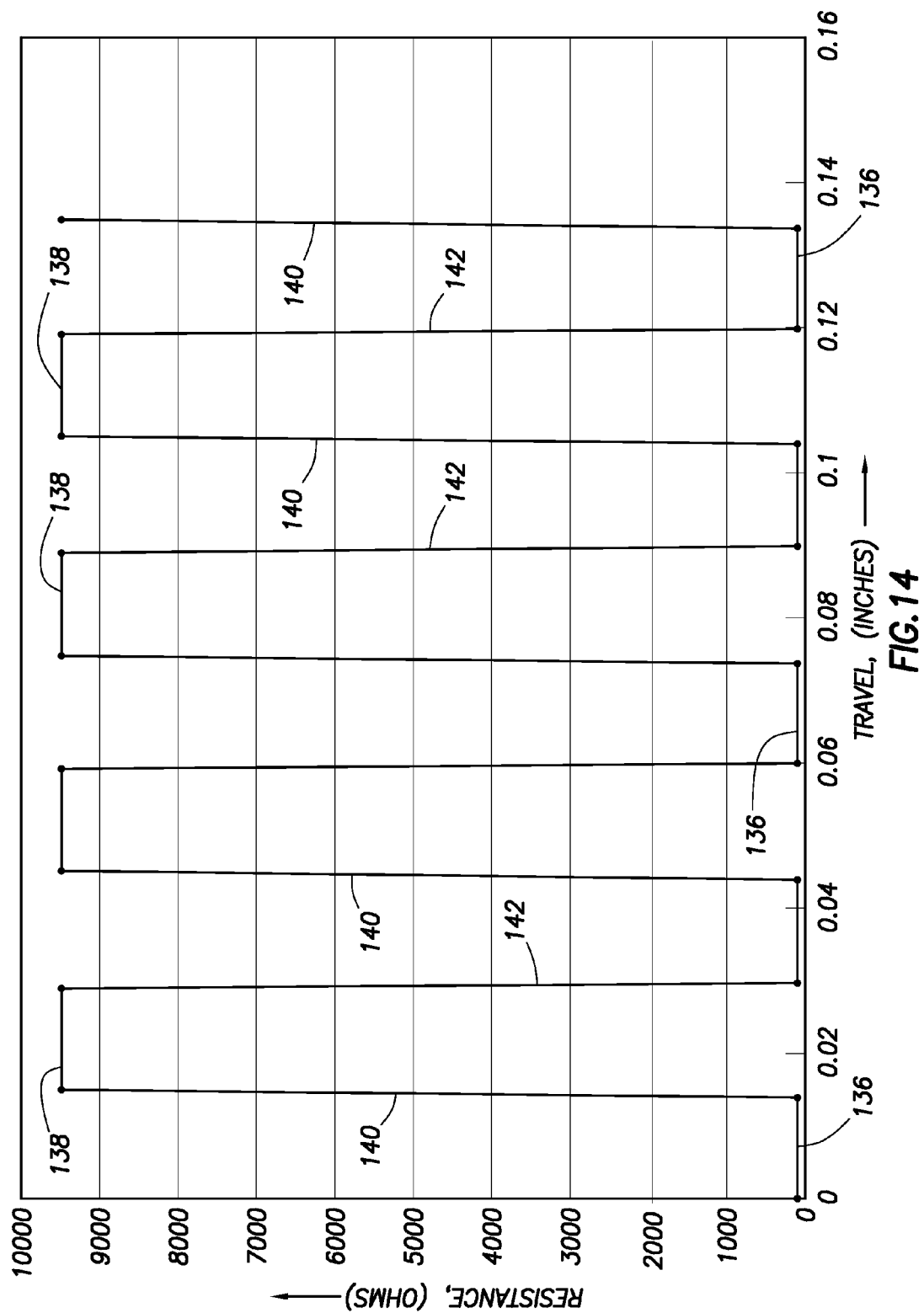
FIG. 14 is a graph of resistance versus displacement for the resistive element configuration of FIG. 13.

A graph of resistance versus travel is representatively illustrated in FIG. 14 for the resistive element 60 configuration of FIG. 13. The relatively low resistance 136 indicated in the graph occurs when the contact fingers 110 are in contact with the conductive strips 120, and the relatively high resistance 138 occurs when the contact fingers are in contact with the insulative layer 116 between the conductive strips.

It will be appreciated that, by counting the occurrences of the relatively low and high resistances 136, 138, or their associated rising or falling edges 140, 142, the position of the contacts 62 relative to the resistive element 60 can be readily determined.

Figure 15:
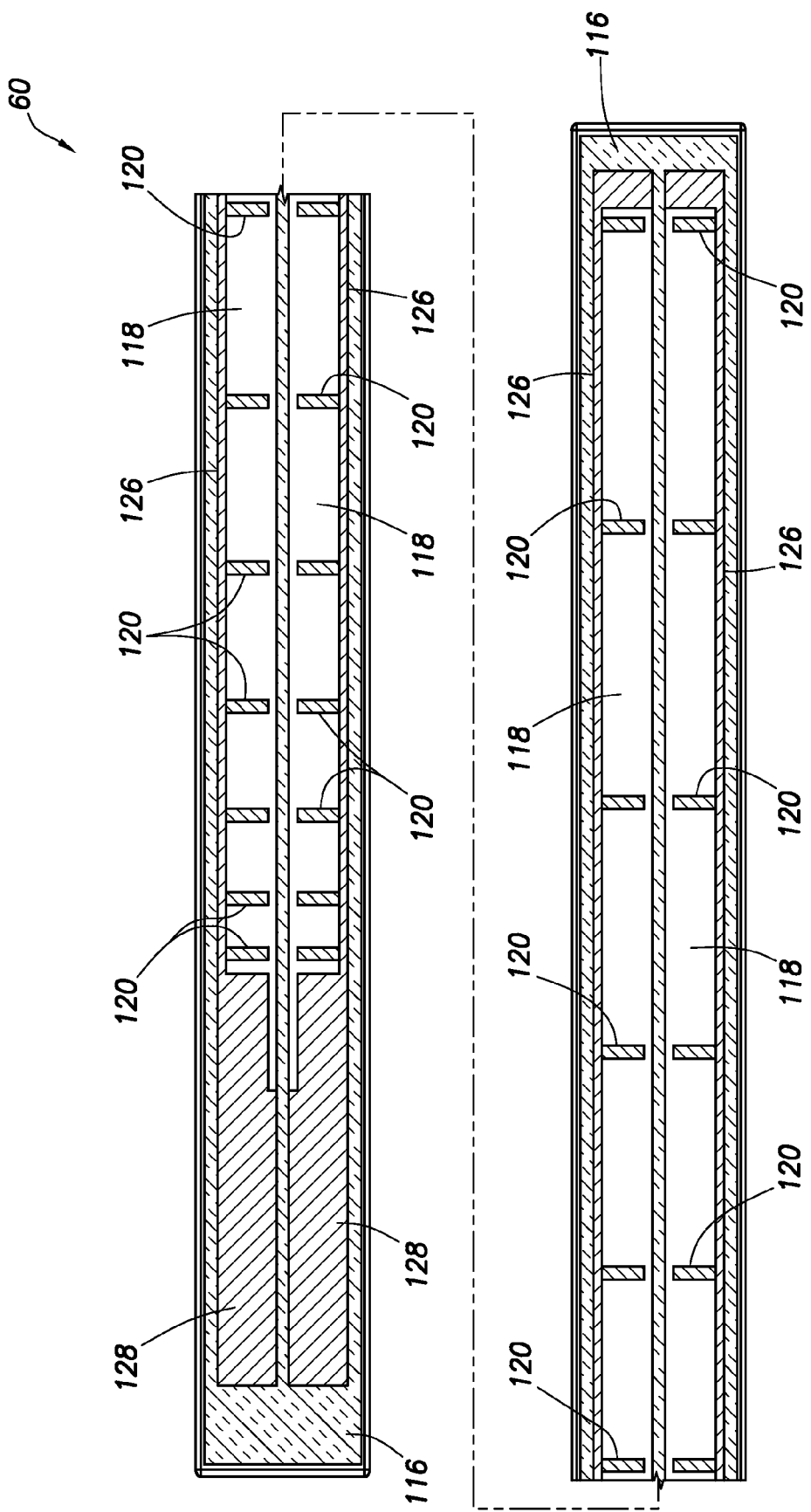
FIGS. 15-19 are elevational views of additional alternate configurations of the resistive element.

Referring additionally now to FIG. 15, another alternate configuration of the resistive element 60 is representatively illustrated. In this configuration, the spacing between the conductive strips 120 is varied along the length of the resistive element 60, so that the displacement distance between the corresponding resistance spikes 130, 132 is also varied.

In this manner, the distance or spacing between the resistance spikes 130, 132 can be used as an indicator of the position of the contacts 62 relative to the resistive element 60. This means that it is not necessary to maintain a count of the resistance spikes 130, 132 in order to ascertain the relative position of the contacts 62 and associated member 56 (although such a count could be maintained as either a primary or backup indication of position).

In addition, the spacing between the resistance spikes 130, 132 can be used as either a primary or backup indication of position in conjunction with the indication provided by the base line 134 resistance between the resistance spikes. An increase or decrease in the spacing between the resistance spikes 130, 132 may also be used as an indication of direction of travel of the contacts 62 relative to the resistive element 60, either as a primary or backup indication in conjunction with the indication of direction provided by the increasing or decreasing of resistance along the base line 134.

Preferably, the spacings between the conductor strips 120 are smallest when the member 56 is positioned toward a closed position of the closure assembly 40, since position changes are typically most critical to desired flow rate near the closed position. However, the spacings between the conductor strips 120 could be smallest when the member 56 is positioned toward an open position of the closure assembly 40, if desired.

Although in FIG. 15 the conductive strips 120 are depicted as having the same length longitudinally along the resistive element 60, and the spacings between the conductive strips are varied by changing the length of the resistive traces 118 between the conductive strips, the spacings could be varied in other manners for any of the resistive element configurations described herein. For example, the lengths of the conductive strips 120 longitudinally along the resistive element 60 could instead be varied (i.e., with the lengths of the resistive traces 118 or insulator layer 116 between the conductive strips also varying).

Figure 16:
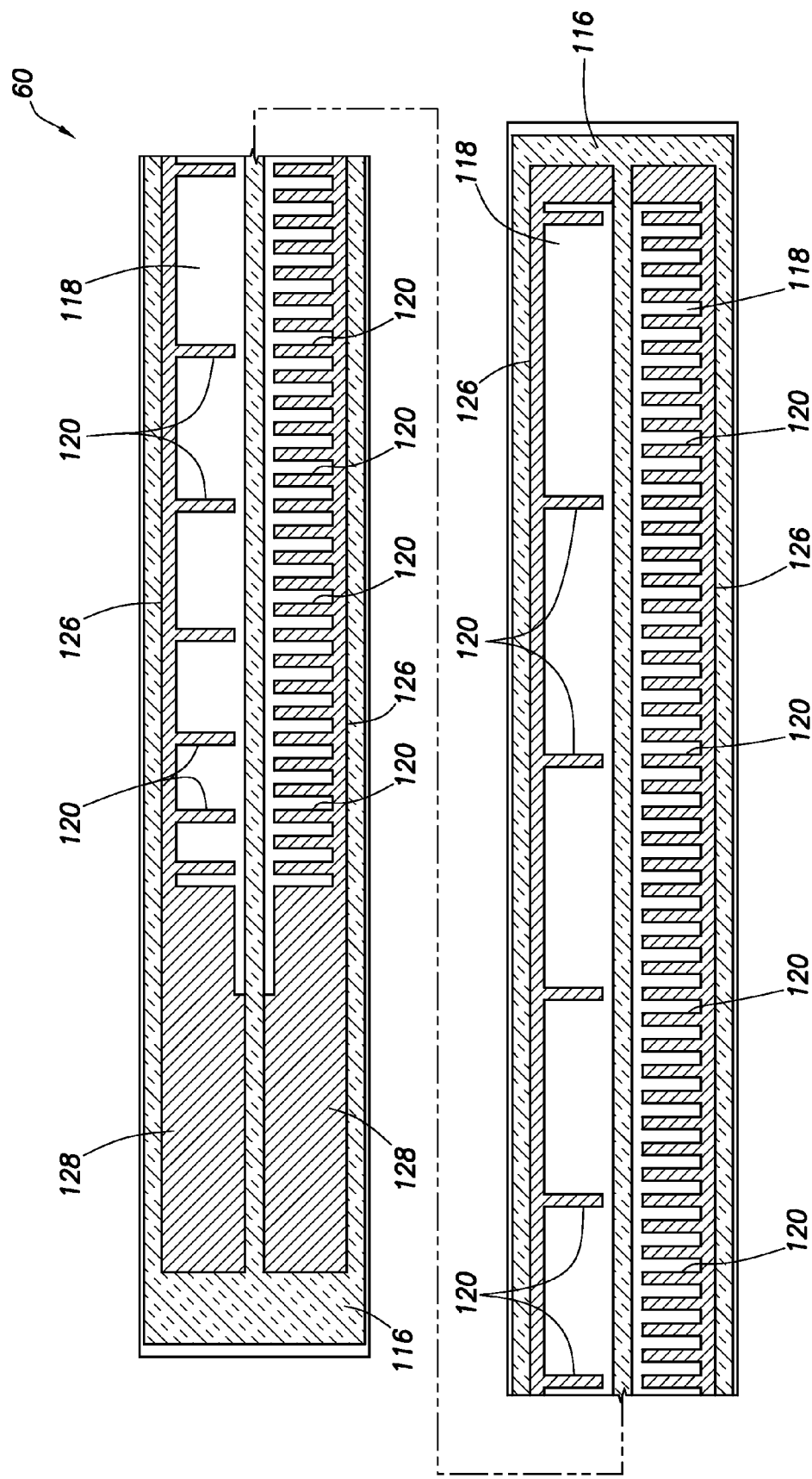

Referring additionally now to FIG. 16, another alternate configuration of the resistive element 60 is representatively illustrated. In this configuration, one set of the conductive strips 120 has the varied longitudinal spacing as described above for the configuration of FIG. 15, and the other set of conductive strips has equidistant spacing as described above for the configuration of FIG. 11.

The conductive strips 120 are, thus, "staggered" in the configuration of FIG. 16, in that the conductive strips are not all aligned on both lateral sides of the resistive element 60. Instead, the conductive strips 120 on the lower side of the resistive element 60 as depicted in FIG. 16 include additional conductive strips between pairs of aligned conductive strips on the upper and lower sides of the resistive element.

This configuration of the resistive element 60 provides increased resolution in the indication of position, since additional resistance spikes (albeit of less amplitude) are provided between the resistance spikes due to the aligned pairs of conductive strips 120. The quantity of these additional resistance spikes also serves as a confirmation of the position of the contacts 62 relative to the resistive element 60.

Figure 17:
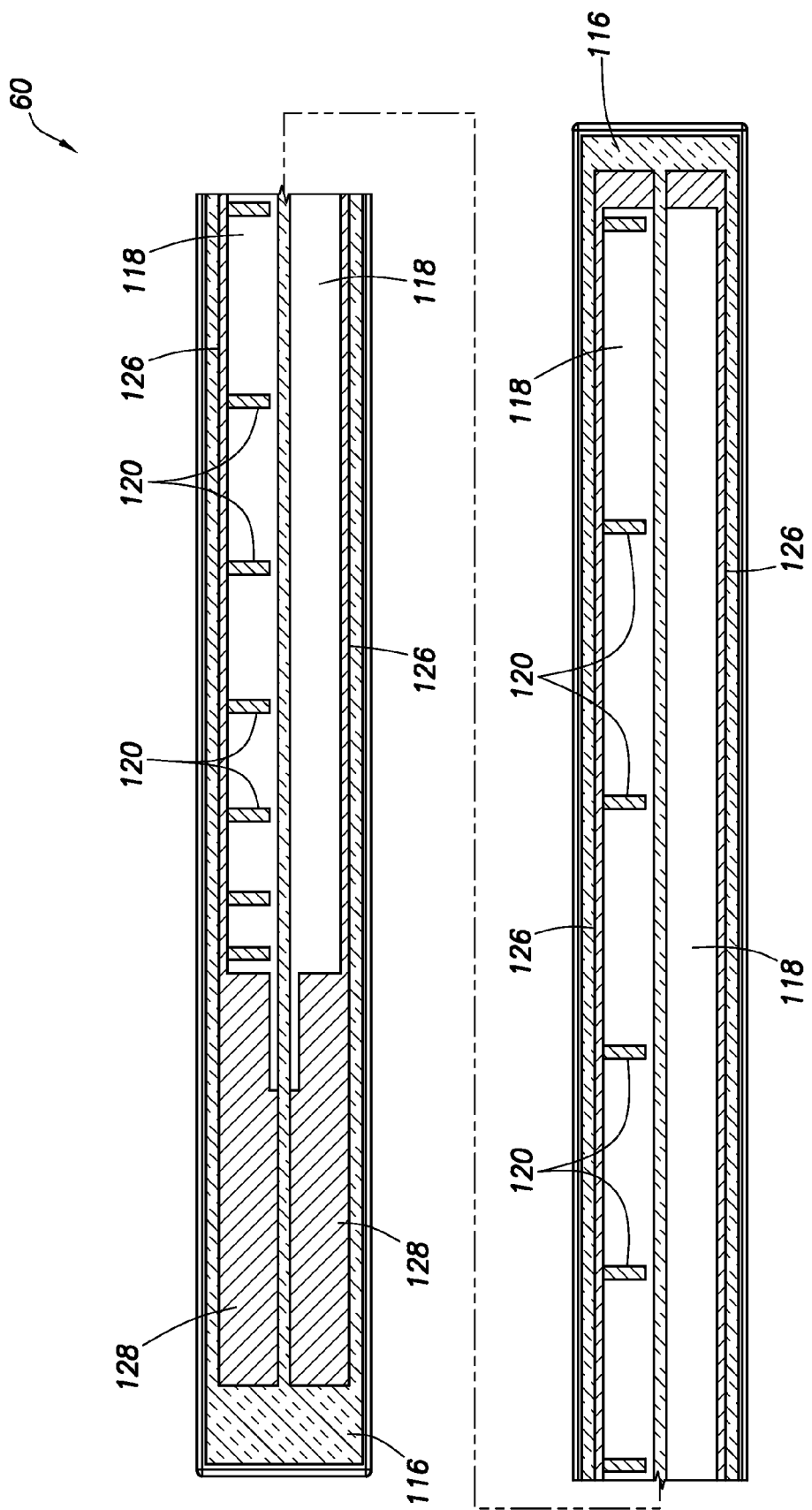

Referring additionally now to FIG. 17, another alternate configuration of the resistive element 60 is representatively illustrated. In this configuration, there are no conductive strips 120 on one side of the resistive element 60 (the lower side as viewed in FIG. 17). Instead, the resistive trace 118 on the lower side of the resistive element 60 is contacted continuously by the contact fingers 110 as the contacts 62 displace relative to the resistive element 60.

The resistance spikes 130, 132 produced by this configuration of the resistive element 60 are expected to be of lower amplitude as compared to those expected from the configuration of FIG. 11, but an advantage may be obtained from not requiring as precise lateral alignment of the contact fingers 110.

Figure 18:
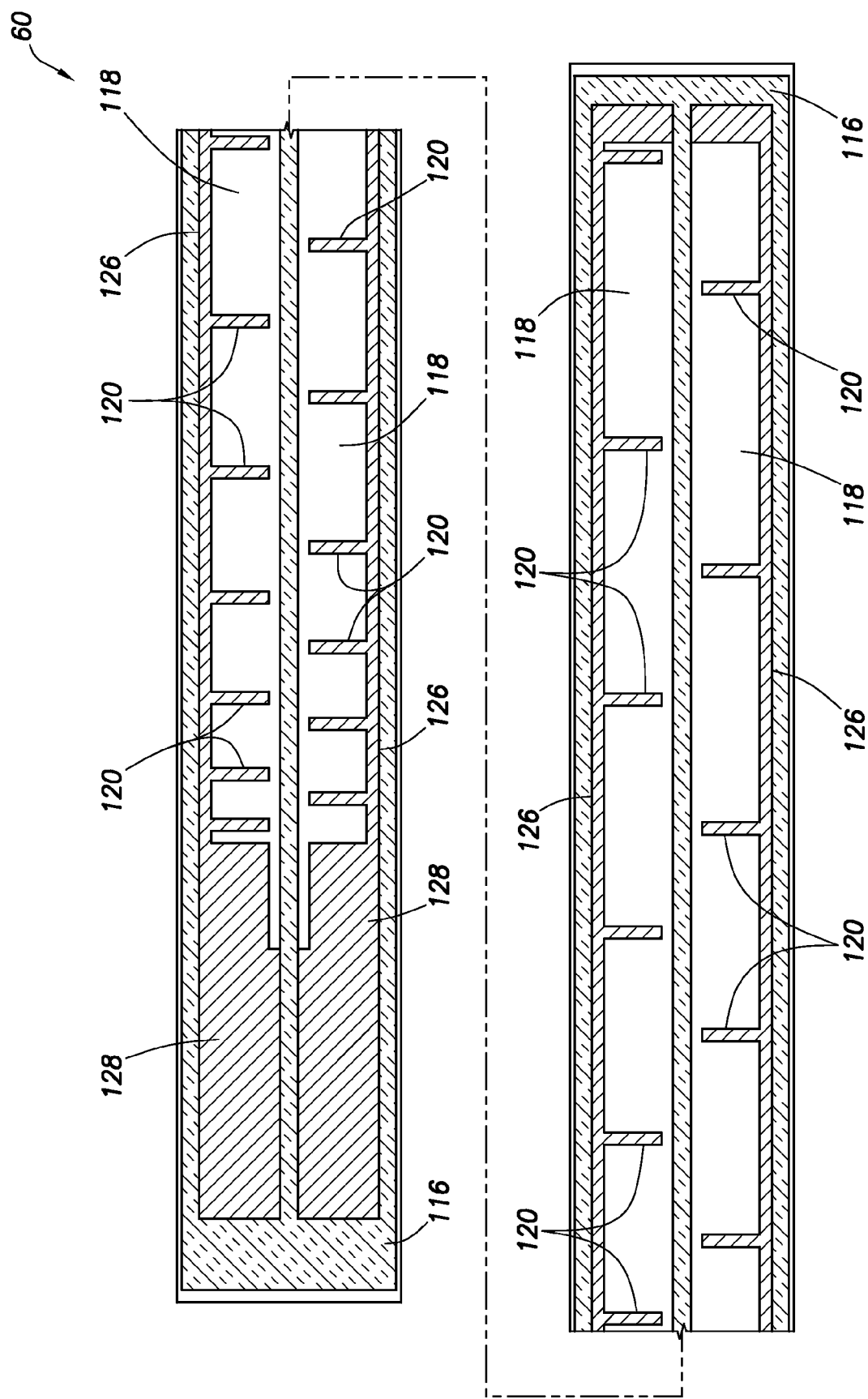

Referring additionally now to FIG. 18, another alternate configuration of the resistive element 60 is representatively illustrated. In this configuration, the spacings between the conductive strips 120 are varied on both sides of the resistive element 60, but the variations are not the same on both sides, and so the conductive strips are "staggered" between the sides.

This configuration provides increased resolution in its indication of position of the contacts 62 relative to the resistive element 60, while also not requiring as precise lateral alignment of the contact fingers 110.

Figure 19:
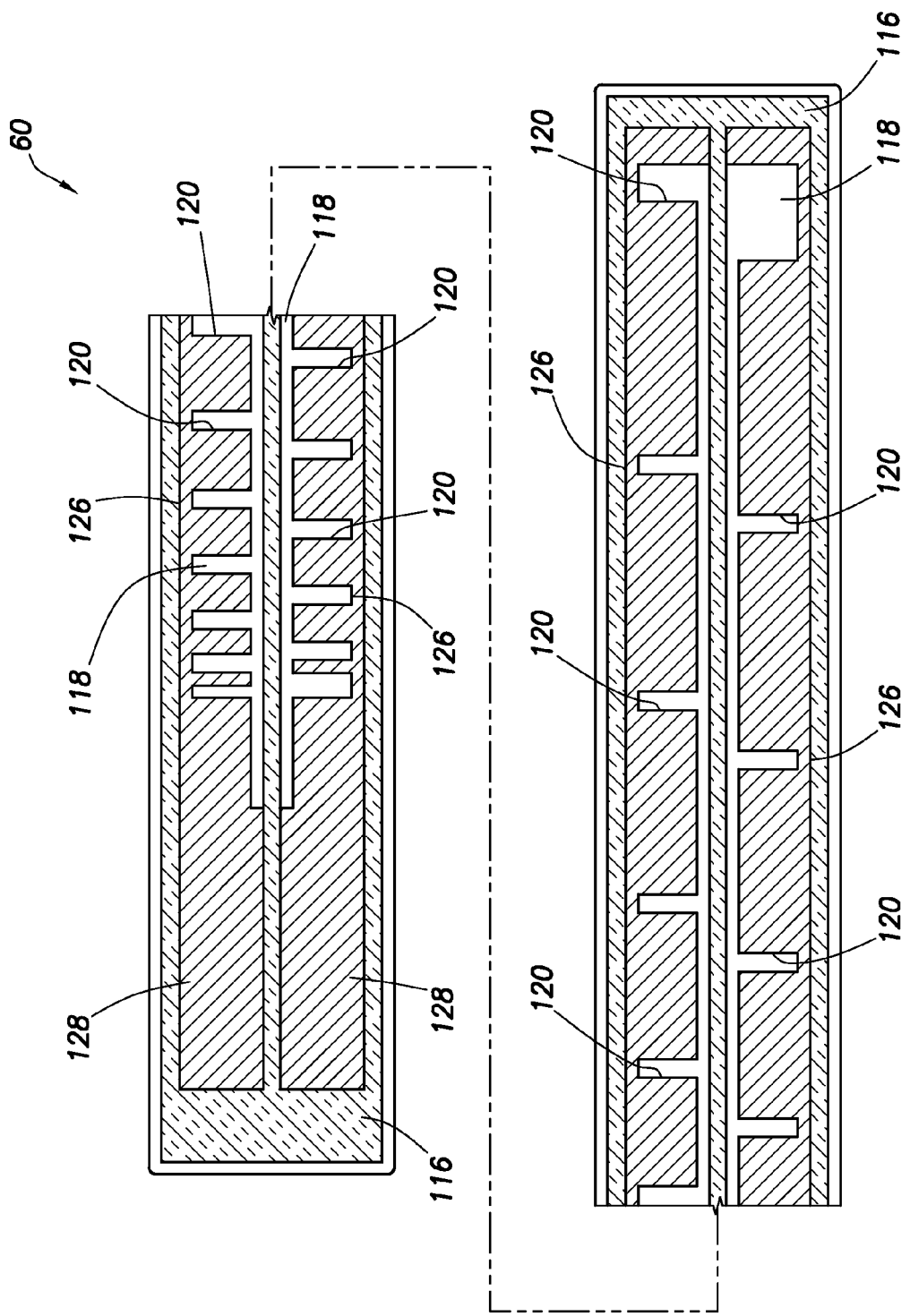

Referring additionally now to FIG. 19, another alternate configuration of the resistive element 60 is representatively illustrated. In this configuration, the lengths of the conductive strips 120 longitudinally along the resistive element 60 are varied, but the spacings between the conductive strips (i.e., the lengths of the resistive traces 118 between the conductive strips) remain the same.

The variation in spacings between the resistive traces 118 is also different for the two sides of the resistive element 60, in a manner somewhat similar to the manner in which the varied spacings between the conductive strips 120 are different in the configuration of FIG. 18. Note that any of the configurations of the resistive element 60 described herein can include conductive strips 120 and/or resistive traces 118 having varied lengths longitudinally along the resistive element.

Figure 20:
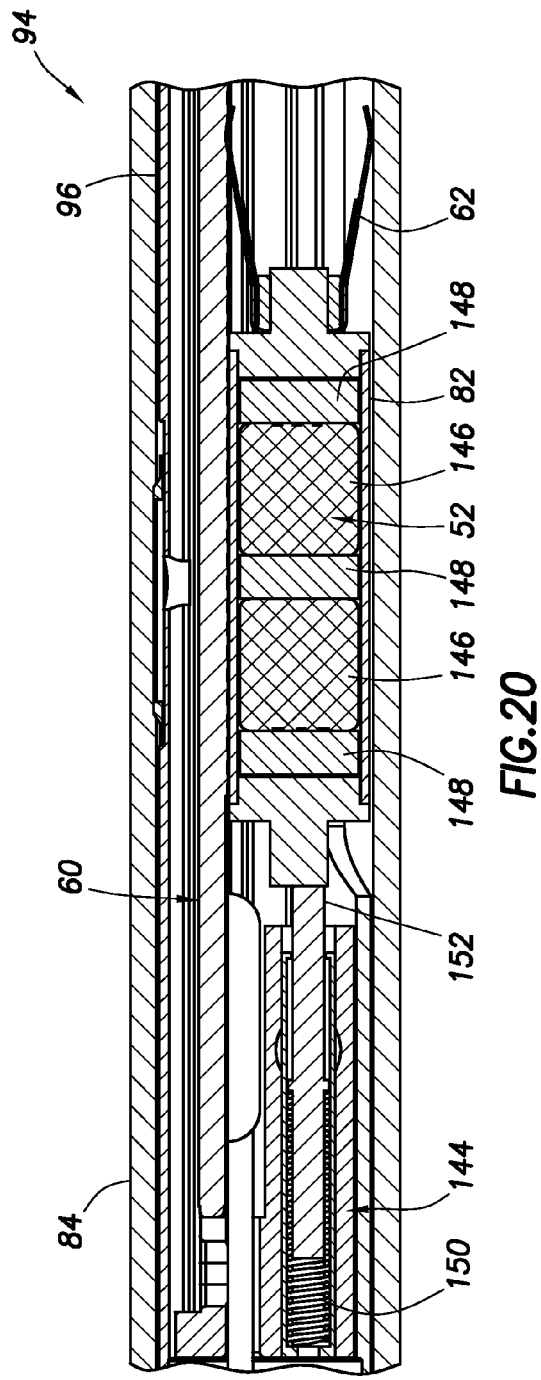
FIGS. 20 and 21 are longitudinal cross-sectional views of an alternate configuration of the indicator portion.
Figure 21:
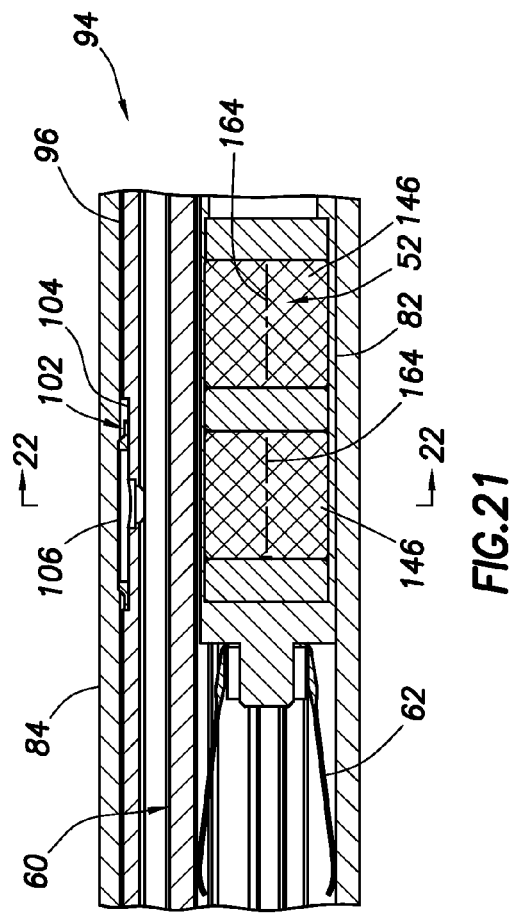

Referring additionally now to FIGS. 20 & 21, an alternate configuration of the indicator portion 94 is representatively illustrated. In this configuration, the diameter of the indicator portion 94 is reduced, and an end load mechanism 144 is provided to reduce a hysteresis effect at the end of travel of the slider 82.

The slider 82 is configured to contain the magnet assembly 52, which includes two magnets 146 and three magnetically permeable material elements 148. The contacts 62 include two sets of fingers, with one set contacting the resistive element 60, and the other set contacting an interior of the tubular structure 84 to thereby provide a grounding contact.

The end load mechanism 144 includes a spring or other type of biasing device 150 and a pin 152. As the slider 82 approaches the end of its travel, it contacts the pin 152 and begins to compress the biasing device 150. The biasing force exerted by the biasing device 150 on the slider 82 in effect "preloads" the slider in preparation for displacement in the opposite direction.

In the absence of the biasing force, the slider 82 experiences drag forces (due to friction between the slider and the carrier 96, friction between the contacts 62 and the resistive element 60 and tubular structure 84, etc.) which hinders its displacement to the right as viewed in FIG. 20. The biasing force exerted by the biasing device 150 counteracts the drag forces, thereby reducing the hysteresis effect.

Another contributor to the hysteresis effect is magnetic lead and lag in the magnetic coupling between the magnetic assemblies 52, 54 whenever the slider 82 reverses direction. The end load mechanism 144 also operates to reduce this component of the hysteresis effect when the slider 82 reverses direction at its end limits of travel.

A somewhat enlarged view of the indicator portion 94 from an opposite side is representatively illustrated in FIG. 21. In this view, it may be seen that, in spite of its significantly reduced size, the carrier 96 can still accommodate use of the support device 102. In addition, the manner in which the contacts 62 are used to contact both the resistive element 60 and the interior of the tubular structure 84 may be more clearly seen.

In the other configurations of the resistive element 60 described above, one of the solder pads 128 would be connected to ground (e.g., via a wire soldered to one of the pads), and the other would be connected to the measurement system, with the contacts 62 providing a conductive path between the two at a variable location along the resistive element. In the configuration of FIGS. 20 and 21, the contacts 62 instead provide a conductive path from the resistive element 60 to ground. In this manner, only one wire or other conductor may be connected to the resistive element 60, and only one set of resistive trace 18, insulator layer 116 and/or conductive strips 120 may be provided on the resistive element, thereby allowing the resistive element to be more laterally compact.

Note that pole axes 164 of the magnets 146 are longitudinally aligned in this embodiment. The magnetically permeable material 148 operates to concentrate the magnetic flux directed toward the magnetic assembly 54 on the closure assembly member 56, thereby allowing use of smaller magnets 146, and further providing for a more compact configuration.

Figure 22:
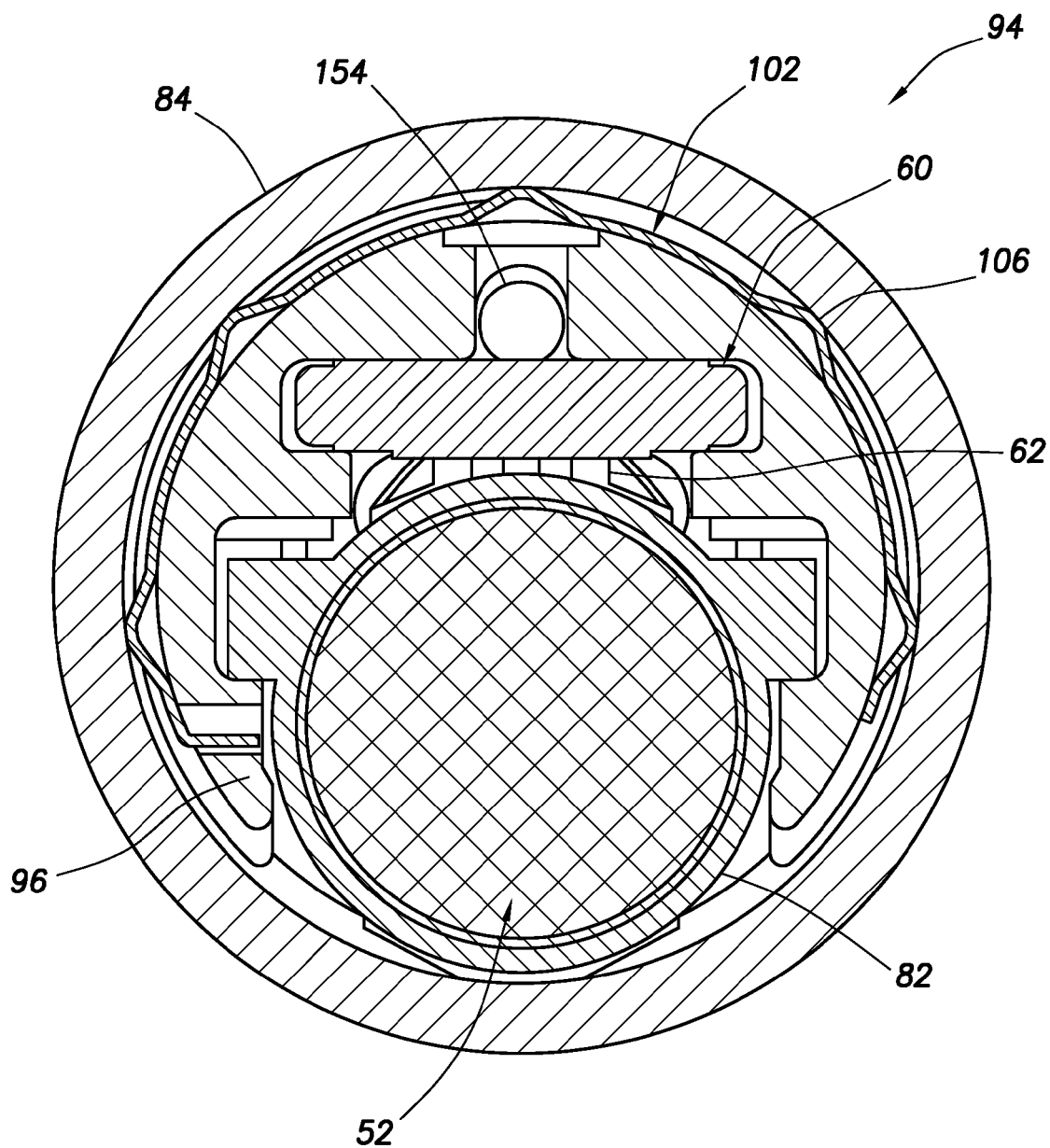
FIG. 22 is a lateral cross-sectional view of the indicator portion configuration of FIGS. 20 and 21.

In FIG. 22, the compact configuration of the indicator portion 94 of FIGS. 20 and 21 may be more completely appreciated. Note that only a single wire or conductor 154 extends to the resistive element 60, since the contacts 62 provide for grounding in this configuration of the indicator portion 94.

Figure 23:
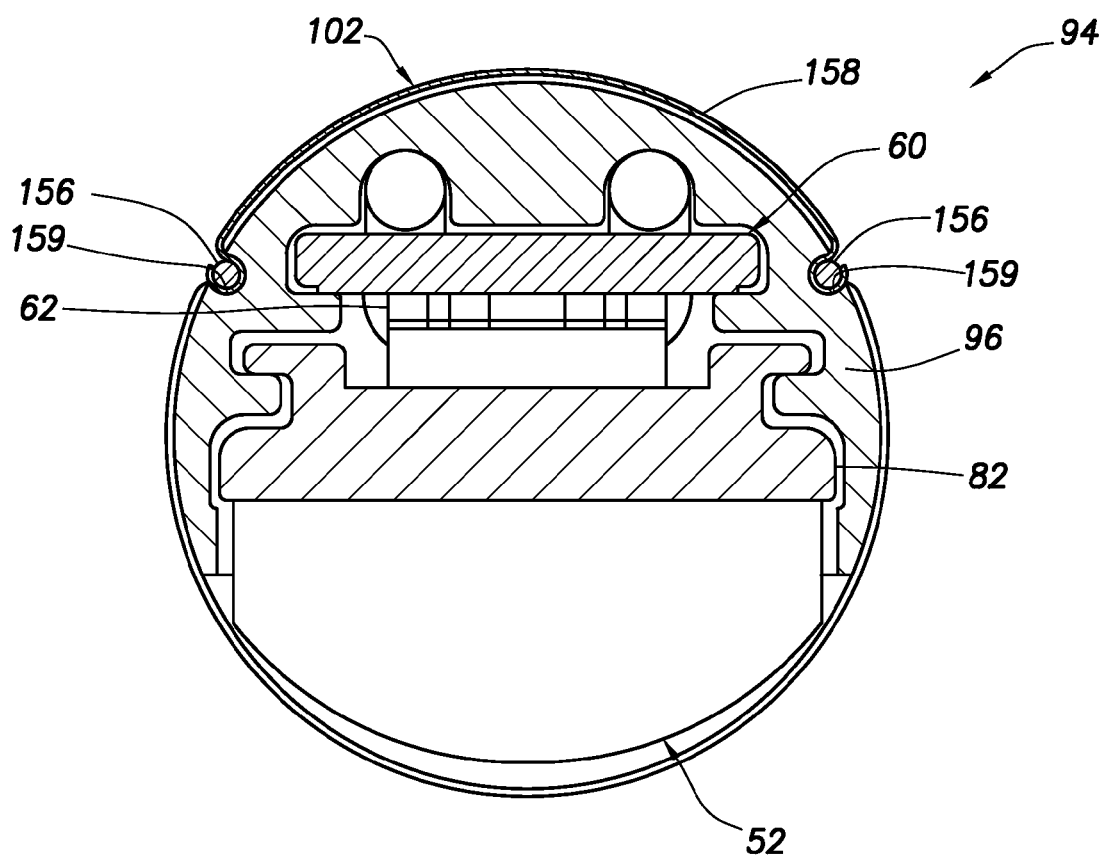
FIG. 23 is a lateral cross-sectional view of an alternate configuration of the support device and carrier.
Figure 24:
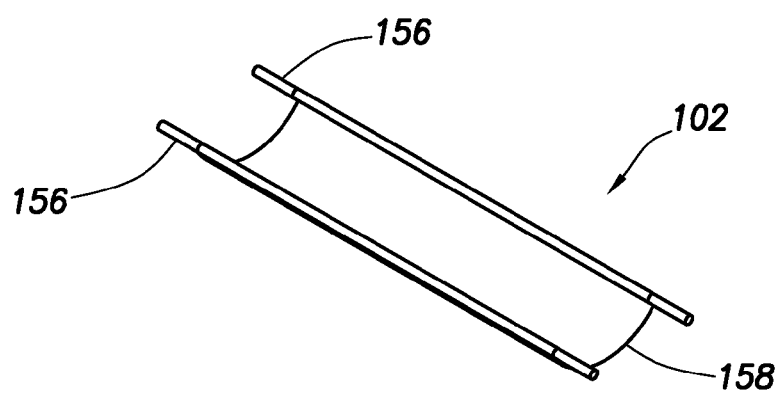
FIG. 24 is an isometric view of the support device configuration of FIG. 23.

Referring additionally now to FIGS. 23 and 24, another alternate configuration of the indicator portion 94 is representatively illustrated, with the tubular structure 84 removed therefrom. In this view, it may be seen that the indicator portion 94 includes a differently configured support device 102 as compared to the previously described support device.

The support device 102 of FIGS. 23 and 24 includes two rods 156 securing opposite edges of a rectangular-shaped sheet of shape memory alloy material 158. As depicted in FIG. 23, the shape memory alloy material 158 is wrapped about a portion of the exterior surface of the carrier 96, and the rods 156 are received in longitudinally extending slots 159 formed in the carrier.

When the shape memory material 158 is heated above a certain elevated temperature (such as in a wellbore), the material contracts, thereby applying a compressive force to certain portions of the carrier 96, and tensile force to other portions of the carrier. This will cause the carrier 96 to spread radially outward and engage the interior of the tubular structure 84 (not shown in FIG. 23). Such engagement between the carrier 96 and the tubular structure 84 will function to reduce displacement of the carrier 96 due to impact and vibration, resulting in reduced damage to the elements of the indicator portion 94, and a more stable electrical signal output.

The rods 156 may also be made of a shape memory alloy, so that when the rods are heated above a certain elevated temperature (such as in a wellbore), the rods will enlarge in diameter. This will function to further secure the edges of the sheet material 158, and may also function to further deform the carrier 96 into engagement with the interior of the tubular structure 84.

Figure 25:
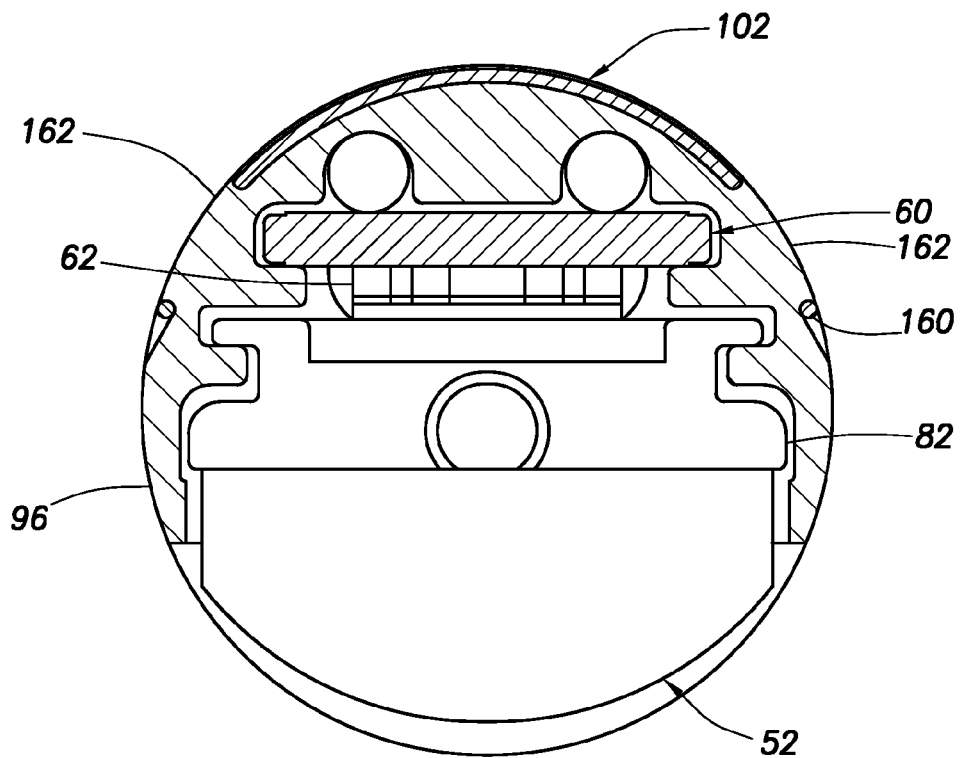
FIG. 25 is a lateral cross-sectional view of another alternate configuration of the support device and carrier.
Figure 26:
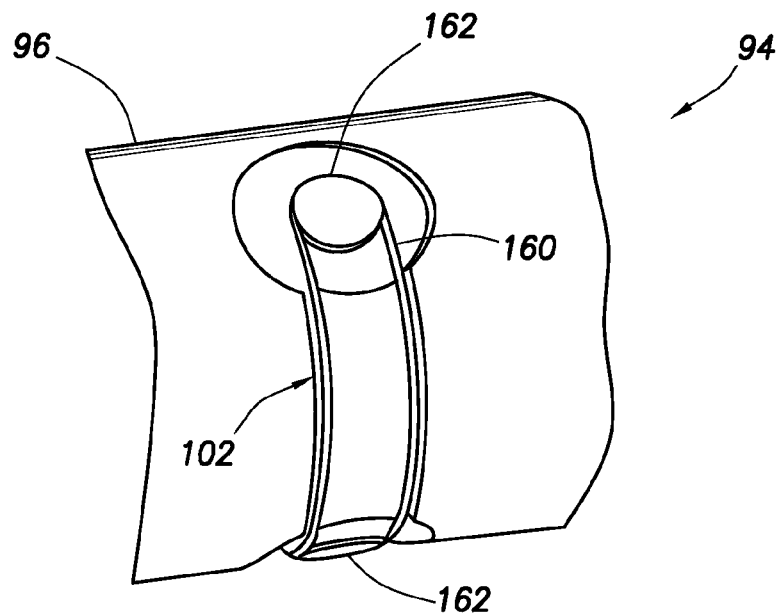
FIG. 26 is an elevational view of the support device and carrier configuration of FIG. 25.

Referring additionally now to FIGS. 25 and 26, another alternate configuration of the indicator portion 94 is representatively illustrated. The tubular structure 84 is shown removed from the indicator portion 94 for illustrative clarity.

In this configuration, the support device 102 comprises a shaped wire 160 made of a shape memory alloy. The wire 160 extends partially about the carrier 96 and encircles two posts 162 formed on the carrier.

When the wire 160 is heated above a certain elevated temperature (such as in a wellbore), the wire will contract, thereby applying forces to the carrier 96. This will cause the carrier 96 to spread radially outward and engage the interior of the tubular structure 84 (not shown in FIG. 25). Such engagement between the carrier 96 and the tubular structure 84 will function to reduce displacement of the carrier 96 due to impact and vibration, resulting in reduced damage to the elements of the indicator portion 94, and a more stable electrical signal output.

Any number and combination of the support device 102 configurations illustrated in FIGS. 3, 4 and 23-26 may be used along the length of the carrier 96. The support devices 102 may, thus, both engage the interior of the tubular structure 84 and cause the carrier 96 itself to engage the interior of the tubular structure.

As described above, the various configurations of the resistive element 60 (in combination with other elements of the indicator portion 94) may be used to indicate a position and direction of displacement of a member 56 in a well tool 16. It should also be appreciated that the position sensor 50 may be used to indicate when a certain operation should be performed or ceased with regard to the well tool 16.

For example, if it is desired to place the closure assembly 40 in a certain configuration (e.g., permitting a certain rate of fluid flow, or a certain pressure differential across the closure assembly), then the indications provided by the indicator portion 94 may be useful in determining when pumping of hydraulic fluid through the lines 38 should be performed or ceased, so that the desired configuration of the closure assembly is achieved. This is important in situations in which the lines 38 are very long or there is otherwise a significant delay between taking action at a remote location (such as at the surface or at a subsea location) and the results of the action being concluded at a downhole location.

It may now be fully appreciated that the present specification provides many significant improvements in the art of position sensors for well tools. For example, using the improved electrical contacts 62, conductive strips 120, dielectric or insulative layer 116 and resistive traces 118 in various combinations described above provides various ways of generating and collecting data from the position sensor 50 that could be used to establish the position of the closure assembly member 56. By counting the resistance changes (e.g., spikes 124, 130, 132 and/or rising and or falling edges 140, 142), the mechanical hardware, electrical hardware and software required for the measurement system can be simplified.

Use of both resistance spike 124, 130, 132 counts and variable resistance readings (i.e., along the base lines 122, 134) is a way to obtain two readings that can be independently used to establish the position of the closure assembly member 56. This redundancy would allow use of essentially the same mechanical hardware with a relatively minor update to the electrical hardware.

Use of low and high resistance spikes 130, 132, varied spacings between the resistance spikes, as well as the variable resistance reading along the base line 134 provides a way to obtain multiple redundant readings that can be independently used to establish the position of the closure assembly member 56. The spikes 124, 130, 132 produce a larger change in resistance that should make the signal change easier to detect, even if the main electronics portion of the measurement system is located at a subsea pod level or at the surface. A large resistance change is also provided by the alternating increased and decreased resistances 136, 138 in the configuration of FIGS. 13 and 14.

The damping device 112 for the contacts 62 limits the effects of shock and vibration on the electrical signal. It also provides a unique alternative to the current technology, which may be either no obvious protection, or oil-filling the tubular structure 84 to provide an environment around the contacts 62 that would provide the damping.

The damping device 112 limits the amount of energy that gets transferred to or from the contact fingers 110. This protects the contact fingers 110 from damage and stabilizes the electrical signal, without the additional time and effort required to oil-fill the tubular structure 84. This also reduces the rework/repair costs which may be associated with other damping devices.

The support devices 102 described above secure the internal subassembly of the indicator portion 94 in the sensor 50 and limit the effects of shock and vibration on the hardware and electrical signal. The contacts 62 and resistive element 60 are thereby protected from physical damage due to shock/vibration. This is accomplished in part by generating a radial and axial preload on the components directly or indirectly associated with the moving parts of the indicator portion 94. This preload stabilizes the internal components relative to the rest of the indicator portion 94.

The preload is preferably not achieved by applying a longitudinal load through the parts. Instead, the preload is achieved by providing sufficient axial and radial loads at the contact areas between the support devices 102 and the parts to be stabilized. This provides an axial drag force that limits the axial response of the hardware, and a radial force that limits the radial response of the hardware.

This protection is provided without the additional time and effort required to oil-fill the indicator portion 94. The support devices 102 are effective in applications where restraint is required on subassemblies in small spaces.

The use of shape memory alloy (SMA) material to preload the internal components of the indicator portion 94 also provides significant advantages. The SMA minimizes the gaps between the internal components and the external tubular structure 84 and preloads (in some embodiments, it even deforms) the carrier 96, so that it reshapes itself to conform to the internal surface of the tubular structure 84. This reduces or eliminates relative movement between the internal components and the external tubular structure 84 if they are exposed to conditions that produce shock or vibration.

Activation of the SMA can cause a section or portion of the internal components to move outward toward the external tubular structure 84. In the embodiments described above, this actually increases the size of the carrier 96 slightly. If the internal components contain a mechanism or configuration that must be free to float or move (such as the slider 82), this outward deflection maintains this freedom of movement.

If the external tubular structure 84 is then subjected to external conditions that would cause the housing to slightly decrease in size (e.g., if its outer diameter becomes smaller due to application of external pressure), then this change in size or shape would be transferred to the internal components. Since the internal components have been initially increased in size to conform to the external tubular structure 84, the subsequent reduction in size would essentially return the internal components toward their original unloaded shape/size. The original size and shape are such that the moveable portions of the internal components can still freely move.

The SMA can be activated with either electrical current or with heat. The SMA can be chosen and configured so that, once activated, it will be permanently set. Alternatively, the SMA can be chosen and configured so that it can be repeatedly activated and deactivated. In the latter case, the internal components of the indicator portion 94 can be assembled and installed relatively easily into the tubular structure 84, and can subsequently be removed from the tubular structure and disassembled relatively easily.

The end load mechanism 144 provides a biasing force on the slider 82 and its associated subassembly which opposes the drag/hysteresis effects. This reduces the overall hysteresis effect on position measurement error, thereby simplifying the method of curve-fitting/curve-smoothing used on the raw data from the sensor 50, by providing a more linear response.

Use of the contacts 62 with opposed fingers (as in the configuration of FIGS. 15-17) simplifies the electrical ground path. This has improved reliability implications.

The magnet assembly 52 having longitudinally aligned pole axes 164 allows the use of smaller magnets without losing a significant amount of magnetic coupling force. This allows the indicator portion 94 to be made significantly smaller.

Furthermore, the sensor 50 can be used not only as a position indicator, but also as a temperature indicator, as described above, by correlating the change in measured resistance to change in temperature. This additional capability is provided while still needing only one electrical conductor from the indicator portion 94. This could replace separate temperature sensors in some applications and could supplement the temperature sensors in other applications. Space may be conserved due to elimination of a separate temperature sensor.

The tubular structure 84 could be filled with a thermally conductive (but electrically dielectric) fluid, if desired, to improve response time to quick environmental temperature changes. The operating temperature range of the indicator portion 94 having this temperature sensing capability would be significantly higher than typical conventional temperature sensors.

A position sensor 50 for a well tool 16 is, thus, provided which comprises an indicator portion 94 including a carrier 96 supporting a resistive element 60 and at least one contact 62, and a support device 102 (which may be made of a shape memory alloy) for supporting the carrier.

The shape memory alloy may respond to a change in temperature to increasingly rigidly support the carrier 96. The shape memory alloy may respond to an electrical current to increasingly rigidly support the carrier 96.

The support device 102 may deform the carrier 96. The support device 102 may engage an interior surface of a tubular structure 84 in which the carrier 96 is received. The support device 102 may resist both axial and radial displacement of the carrier 96 relative to the tubular structure 84.

A position sensor 50 for a well tool 16 is also provided in which the position sensor includes the indicator portion 94 including a slider 82 for displacing at least one contact 62 relative to a resistive element 60. The slider 82 is displaceable between first and second limits. An end load mechanism 144 includes a biasing device 150 which exerts a biasing force on the slider 82 as the slider approaches at least the first limit.

The end load mechanism 144 may apply the biasing force in a direction opposite to one or more drag forces which act on the slider 82. The slider 82 may reverse direction at the first limit, and the end load mechanism 144 may apply the biasing force to the slider 82 as the slider reverses direction.

A position sensor 50 for a well tool 16 is also provided which may include an indicator portion 94 with a resistive element 60 and at least one contact 62 which contacts and displaces across the resistive element. A change in position of the contact 62 relative to the resistive element 60 is indicated by a resistance change as the contact displaces across the resistive element.

The resistance change may comprise at least one resistance spike 124, 130, 132. The resistance spike 124, 130, 132 may be in a positive and/or negative direction. The position of the contact 62 relative to the resistive element 60 may be indicated by a corresponding number of the resistance spikes 124, 130, 132. The resistance change may also include a gradual increase or decrease in resistance, depending on direction of displacement of the contact 62 relative to the resistive element 60.

The position of the contact 62 relative to the resistive element 60 may be indicated by a corresponding spacing between the resistance spikes 124, 130, 132. The spacing between the resistance spikes 124, 130, 132 may vary with a corresponding varying of length of conductive strips 120 on the resistive element 60. The spacing between the resistance spikes 124, 130, 132 may vary with a corresponding varying of length of resistive traces 118 on the resistive element 60.

The resistance change may comprise alternating increased resistance 138 and decreased resistance 136. The resistance change may provide a sufficient electrical signal change output by the indicator portion 94 to allow placement of signal measurement electronics at a subsea pod level or the surface.

A temperature change in the indicator portion 94 may be indicated by a change in indicated resistance corresponding to a predetermined position of the contact 62 relative to the resistive element 60.

The position sensor 50 may also include a damping device 112 which dampens deflection of the contact 62 relative to the resistive element 60 in response to movement of the indicator portion 94. The damping device 112 may include a viscoelastic material in contact with the contact 62.

The contact 62 may include at least two opposing contact fingers, at least one of the fingers providing an electrical grounding for an electrical circuit including the resistive element 60.

Of course, a person skilled in the art would, upon a careful consideration of the above description of representative embodiments of the invention, readily appreciate that many modifications, additions, substitutions, deletions, and other changes may be made to the specific embodiments, and such changes are contemplated by the principles of the present invention. Accordingly, the foregoing detailed description is to be clearly understood as being given by way of illustration and example only, the spirit and scope of the present invention being limited solely by the appended claims and their equivalents.

What is claimed is:

1. A position sensor for a well tool, the position sensor comprising:
    a housing;
    an indicator portion including a carrier supporting a resistive element and at least one contact, the indicator portion being positioned within the housing; and
    at least one support device which secures the carrier within the housing, the support device being positioned between the carrier and an internal surface of the housing.

2. The position sensor of claim 1, wherein the support device deforms the carrier.

3. The position sensor of claim 1, wherein the support device comprises a shape memory alloy.

4. The position sensor of claim 3, wherein the shape memory alloy responds to a change in temperature to increasingly rigidly support the carrier.

5. The position sensor of claim 3, wherein the shape memory alloy responds to an electrical current to increasingly rigidly support the carrier.

6. The position sensor of claim 1, wherein the support device engages an interior surface of a tubular structure in which the carrier is received.

7. The position sensor of claim 6, wherein the support device resists both axial and radial displacement of the carrier relative to the tubular structure.

* * * * *